(12) United States Patent
North

(10) Patent No.: US 7,805,710 B2
(45) Date of Patent: Sep. 28, 2010

(54) SHARED CODE CACHING FOR PROGRAM CODE CONVERSION

(75) Inventor: Geraint North, Manchester (GB)

(73) Assignee: International Business Machines Corporation, Armonk, NY (US)

( * ) Notice: Subject to any disclaimer, the term of this patent is extended or adjusted under 35 U.S.C. 154(b) by 954 days.

(21) Appl. No.: 10/813,867

(22) Filed: Mar. 30, 2004

(65) Prior Publication Data

US 2005/0015758 A1    Jan. 20, 2005

(30) Foreign Application Priority Data

Jul. 15, 2003    (GB)    ................... 0316532.1
Dec. 4, 2003    (GB)    ................... 0328119.3

(51) Int. Cl.
G06F 9/45        (2006.01)
G06F 13/00       (2006.01)
G06F 15/00       (2006.01)

(52) U.S. Cl. ................. 717/136; 717/138; 717/140; 717/141; 717/151; 717/146; 711/118; 711/147; 712/1; 712/200; 712/208; 712/209; 712/212

(58) Field of Classification Search ......... 717/136–161; 711/3, 113, 118–146, 216
See application file for complete search history.

(56) References Cited

U.S. PATENT DOCUMENTS

| | | | | |
|---|---|---|---|---|
| 5,475,840 A | * | 12/1995 | Nelson et al. | ............... 719/331 |
| 5,768,593 A | | 6/1998 | Walters et al. | |
| 5,953,736 A | * | 9/1999 | O'Connor et al. | ............... 711/6 |
| 6,044,220 A | * | 3/2000 | Breternitz, Jr. | ............... 717/139 |
| 6,249,788 B1 | * | 6/2001 | Ronstrom | ............... 707/101 |
| 6,397,242 B1 | * | 5/2002 | Devine et al. | ................ 718/1 |
| 6,415,360 B1 | * | 7/2002 | Hughes et al. | ............... 711/139 |
| 6,502,237 B1 | * | 12/2002 | Yates et al. | ................ 717/136 |
| 6,615,300 B1 | | 9/2003 | Banning et al. | |
| 6,631,514 B1 | * | 10/2003 | Le | ............... 717/137 |
| 6,813,522 B1 | * | 11/2004 | Schwarm et al. | ............... 700/5 |
| 6,820,255 B2 | * | 11/2004 | Babaian et al. | ............. 717/151 |
| 6,826,750 B1 | * | 11/2004 | Curtis et al. | ................ 717/170 |
| 7,058,932 B1 | * | 6/2006 | Jennings et al. | ............. 717/138 |

(Continued)

FOREIGN PATENT DOCUMENTS

EP    0737914    10/1996

(Continued)

OTHER PUBLICATIONS

Gschwind, "Method and apparatus for determining branchaddresses in programs generated by binary translation," Jul. 1998.*

(Continued)

*Primary Examiner*—Insun Kang
(74) *Attorney, Agent, or Firm*—Matthew B. Talpis; Gregory K Goshorn; Greg Goshorn, P.C.

(57) ABSTRACT

Subject program code is translated to target code in basic block units at run-time in a process wherein translation of basic blocks is interleaved with execution of those translations. A shared code cache mechanism is added to persistently store subject code translations, such that a translator may reuse translations that were generated and/or optimized by earlier translator instances.

66 Claims, 16 Drawing Sheets

U.S. PATENT DOCUMENTS

| | | | |
|---|---|---|---|
| 7,111,096 B1 * | 9/2006 | Banning et al. | 710/100 |
| 2001/0049818 A1 | 12/2001 | Banerjia et al. | |
| 2002/0059268 A1 * | 5/2002 | Babaian et al. | 707/100 |
| 2002/0133810 A1 | 9/2002 | Giles et al. | |
| 2003/0093775 A1 * | 5/2003 | Hilton | 717/138 |
| 2004/0133884 A1 * | 7/2004 | Zemach et al. | 717/138 |
| 2006/0225031 A1 * | 10/2006 | Petersen et al. | 717/104 |

FOREIGN PATENT DOCUMENTS

| | | |
|---|---|---|
| EP | 0930572 | 7/1999 |
| EP | 1 039 374 A2 | 9/2000 |
| GB | 2393274 A | 3/2004 |
| WO | WO 98/00779 | 1/1998 |

OTHER PUBLICATIONS

Miller et al., "Software Based Instruction Caching for the RAW Architecture," MIT, May 1999.*

Magnusson, "Efficient Instruction Cache Simulation and Execution Profiling With a Threaded-Code Interpreter," IEEE, 1997.*

* cited by examiner

SHARED CODE CACHING FOR PROGRAM CODE CONVERSION

BACKGROUND

1. Technical Field

The subject invention relates generally to the field of computers and computer software and, more particularly, to program code conversion methods and apparatus useful, for example, in code translators, emulators and accelerators.

2. Description of Related Art

In both embedded and non-embedded CPU's, one finds predominant Instruction Set Architectures (ISAs) for which large bodies of software exist that could be "accelerated" for performance, or "translated" to a myriad of capable processors that could present better cost/performance benefits, provided that they could transparently access the relevant software. One also finds dominant CPU architectures that are locked in time to their ISA, and cannot evolve in performance or market reach. Such architectures would benefit from "Synthetic CPU" co-architecture.

Program code conversion methods and apparatus facilitate such acceleration, translation and co-architecture capabilities and are addressed, for example, in the co-pending patent applications entitled "Program Code Conversion," U.S. application Ser. No. 09/827,971.

SUMMARY

The following is a summary of various aspects and advantages realizable according to various embodiments according to the invention. It is provided as an introduction to assist those skilled in the art to more rapidly assimilate the detailed design discussion that ensues and does not and is not intended in any way to limit the scope of the claims that are appended hereto.

With this understanding, the inventors hereafter disclose a technique directed at expediting program code conversion, particularly useful in connection with a run-time translator which employs translation of subject program code into target code. In particular, a shared code cache mechanism is provided for storing subject code translations for re-use. In one implementation, subject code generated by one translator instance is cached for reuse by subsequent translator instances. Various other implementations, embodiments and enhancements of such mechanisms are further provided.

BRIEF DESCRIPTION OF THE DRAWINGS

The accompanying drawings, which are incorporated in and constitute a part of the specification, illustrate presently preferred implementations and are described as follows.

DETAILED DESCRIPTION

FIGS. 1-8 hereafter illustrate methods, apparatus and program code useful in program code conversion. FIG. 9 illustrates various aspects of a shared code caching technique useful, for example, in program code conversion systems such as illustrated in FIGS. 1-8.

Figure 1:
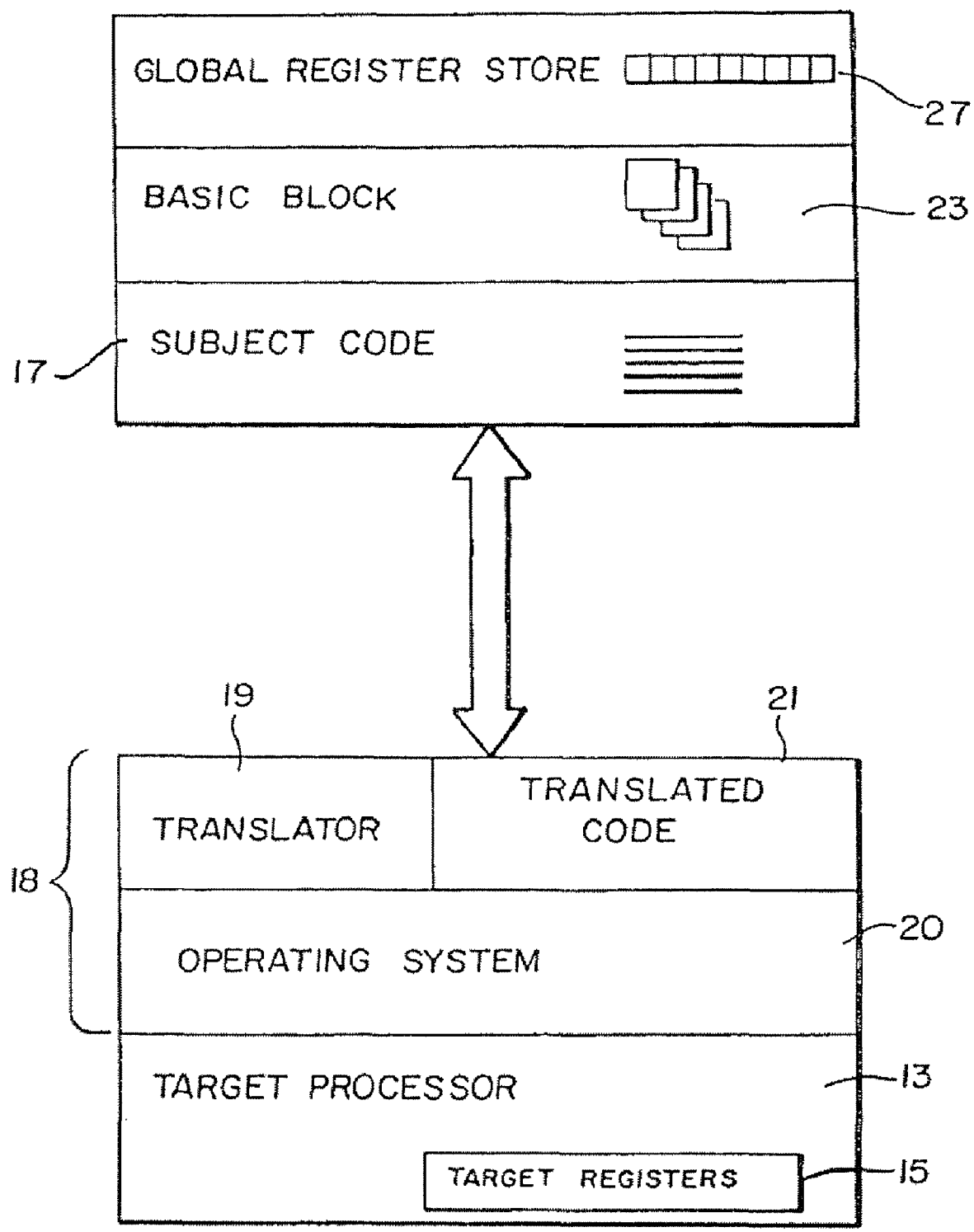
FIG. 1 is a block diagram of apparatus wherein embodiments of the invention find application.

FIG. 1 illustrates a target processor 13 including target registers 15 together with memory which is an example of a program storage medium 18 storing a number of software components 19, 20, 21, and providing working storage including a basic block cache 23, a global register store 27, and the subject code 17 to be translated. The software components include an operating system 20, the translator code 19, and translated code 21. The translator code 19 may function, for example, as an emulator translating subject code of one ISA into translated code of another ISA or as an accelerator for translating subject code into translated code, each of the same ISA.

The translator 19, i.e., the compiled version of the source code implementing the translator, and the translated code 21, i.e., the translation of the subject code 17 produced by the translator 19, run in conjunction with the operating system 20 such as, for example, UNIX running on the target processor 13, typically a microprocessor or other suitable computer. It will be appreciated that the structure illustrated in FIG. 1 is exemplary only and that, for example, software, methods and processes according to the invention may be implemented in code residing within or beneath an operating system. The subject code, translator code, operating system, and storage mechanisms may be any of a wide variety of types, as known to those skilled in the art.

In apparatus according to FIG. 1, program code conversion is preferably performed dynamically, at run-time, while the translated code 21 is running. The translator 19 runs inline with the translated program 21. The execution path of the translation process is a control loop comprising the steps of: executing translator code 19, which translates a block of the subject code 17 into translated code 21, and then executing that block of translated code; the end of each block of translated code contains instructions to return control back to the translator code 19. In other words, the steps of translating and then executing the subject code are interlaced, such that only portions of the subject program 17 are translated at a time and the translated code of a first basic block is executed prior to the translation of subsequent basic blocks. The translator's fundamental unit of translation is the basic block, meaning that the translator 19 translates the subject code 17 one basic block at a time. A basic block is formally defined as a section of code with exactly one entry point and exactly one exit point, which limits the block code to a single control path. For this reason, basic blocks are the fundamental unit of control flow.

In the process of generating the translated code 21, intermediate representation ("IR") trees are generated based on the subject instruction sequence. IR trees are abstract representations of the expressions calculated and operations performed by the subject program. Later, translated code 21 is generated based on the IR trees.

The collections of IR nodes described herein are colloquially referred to as "trees". We note that, formally, such structures are in fact directed acyclic graphs (DAGs), not trees. The formal definition of a tree requires that each node have at most one parent. Because the embodiments described use common subexpression elimination during IR generation, nodes will often have multiple parents. For example, the IR of a flag-affecting instruction result may be referred to by two abstract registers, those corresponding to the destination subject register and the flag result parameter.

For example, the subject instruction "add %r1, %r2, %r3" performs the addition of the contents of subject registers %r2 and %r3 and stores the result in subject register %r1. Thus, this instruction corresponds to the abstract expression "%r1=%r2+%r3". This example contains a definition of the abstract register %r1 with an add expression containing two subexpressions representing the instruction operands %r2 and %r3. In the context of a subject program 17, these subexpressions may correspond to other, prior subject instructions, or they may represent details of the current instruction such as immediate constant values.

When the "add" instruction is parsed, a new "+" IR node is generated, corresponding to the abstract mathematical operator for addition. The "+" IR node stores references to other IR nodes that represent the operands (represented in the IR as subexpression trees, often held in subject registers). The "+" node is itself referenced by the subject register whose value it defines (the abstract register for %r1, the instruction's destination register). For example, the center-right portion of FIG. 20 shows the IR tree corresponding to the X86 instruction "add %ecx, %edx".

As those skilled in the art may appreciate, in one embodiment the translator 19 is implemented using an object-oriented programming language such as C++. For example, an IR node is implemented as a C++ object, and references to other nodes are implemented as C++ references to the C++ objects corresponding to those other nodes. An IR tree is therefore implemented as a collection of IR node objects, containing various references to each other.

Further, in the embodiment under discussion, IR generation uses a set of abstract registers. These abstract registers correspond to specific features of the subject architecture. For example, there is a unique abstract register for each physical register on the subject architecture ("subject register"). Similarly, there is a unique abstract register for each condition code flag present on the subject architecture. Abstract registers serve as placeholders for IR trees during IR generation. For example, the value of subject register %r2 at a given point in the subject instruction sequence is represented by a particular IR expression tree, which is associated with the abstract register for subject register %r2. In one embodiment, an abstract register is implemented as a C++ object, which is associated with a particular IR tree via a C++ reference to the root node object of that tree.

In the example instruction sequence described above, the translator has already generated IR trees corresponding to the values of %r2 and %r3 while parsing the subject instructions that precede the "add" instruction. In other words, the subexpressions that calculate the values of %r2 and %r3 are already represented as IR trees. When generating the IR tree for the "add %r1, %r2, %r3" instruction, the new "+" node contains references to the IR subtrees for %r2 and %r3.

The implementation of the abstract registers is divided between components in both the translator code 19 and the translated code 21. Within the translator 19, an "abstract register" is a placeholder used in the course of IR generation, such that the abstract register is associated with the IR tree that calculates the value of the subject register to which the particular abstract register corresponds. As such, abstract registers in the translator may be implemented as a C++ object which contains a reference to an IR node object (i.e., an IR tree). The aggregate of all IR trees referred to by the abstract register set is referred to as the working IR forest ("forest" because it contains multiple abstract register roots, each of which refers to an IR tree). The working IR forest represents a snapshot of the abstract operations of the subject program at a particular point in the subject code.

Within the translated code 21, an "abstract register" is a specific location within the global register store, to and from which subject register values are synchronized with the actual target registers. Alternatively, when a value has been loaded from the global register store, an abstract register in the translated code 21 could be understood to be a target register 15, which temporarily holds a subject register value during the execution of the translated code 21, prior to being saved back to the register store.

Figure 2:
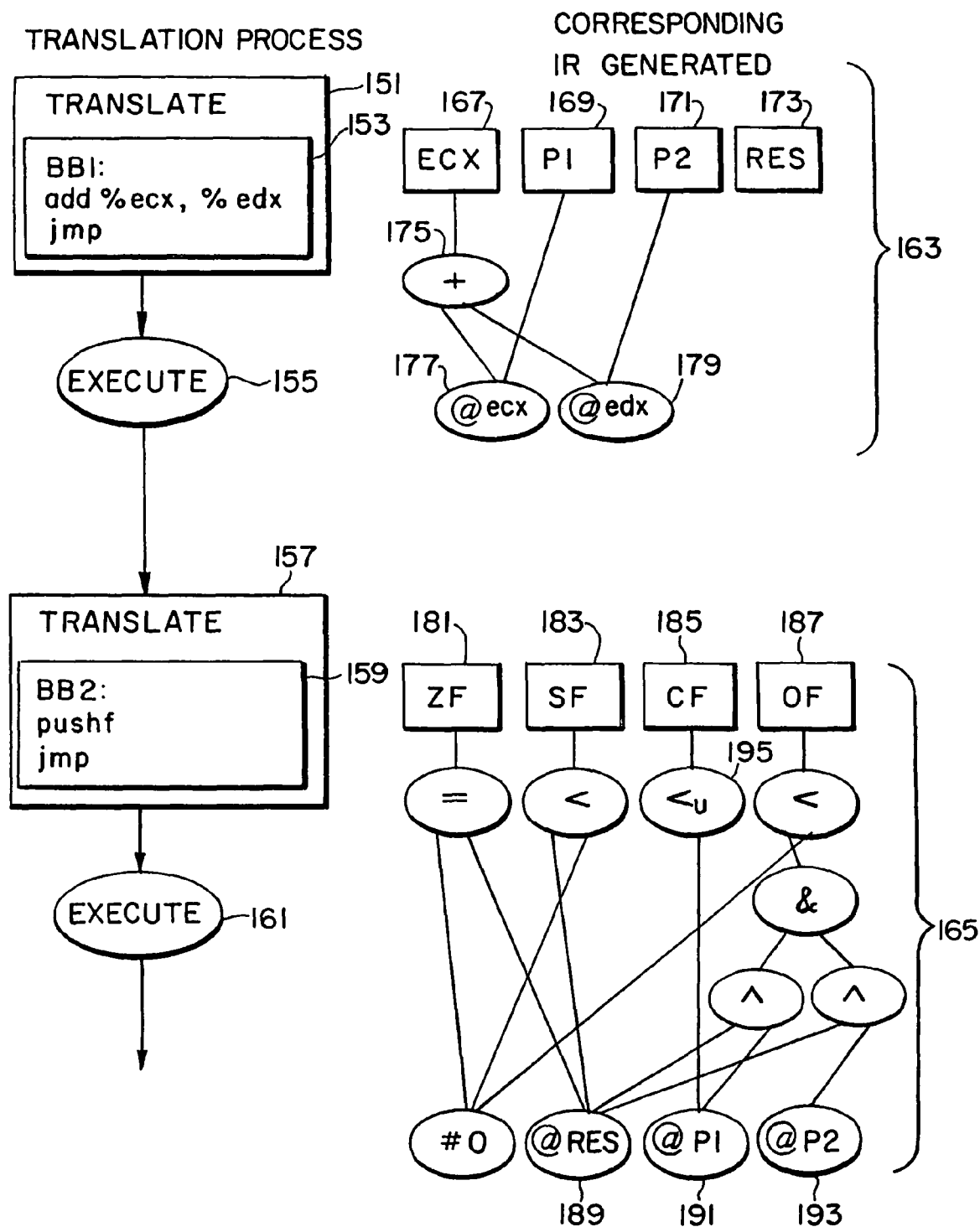
FIG. 2 is a schematic diagram illustrating a run-time translation process and corresponding IR (intermediate representation) generated during the process.

An example of program translation as described above is illustrated in FIG. 2. FIG. 2 shows the translation of two basic blocks of x86 instructions, and the corresponding IR trees that are generated in the process of translation. The left side of FIG. 2 shows the execution path of the translator 19 during translation. In step 151, the translator 19 translates a first basic block 153 of subject code into target code 21 and then, in step 155, executes that target code 21. When the target code 21 finishes execution, control is returned to the translator 19, step 157, wherein the translator translates the next basic block 159 of subject code 17 into target code 21 and then executes that target code 21, step 161, and so on.

In the course of translating the first basic block 153 of subject code into target code, the translator 19 generates an IR tree 163 based on that basic block 153. In this case, the IR tree 163 is generated from the source instruction "add %ecx, %edx," which is a flag-affecting instruction. In the course of generating the IR tree 163, four abstract registers are defined by this instruction: the destination abstract register % ecx 167, the first flag-affecting instruction parameter 169, the second flag-affecting instruction parameter 171, and the flag-affecting instruction result 173. The IR tree corresponding to the "add" instruction is a "+" operator 175 (i.e., arithmetic addition), whose operands are the subject registers %ecx 177 and %edx 179.

Thus, emulation of the first basic block 153 puts the flags in a pending state by storing the parameters and result of the flag-affecting instruction. The flag-affecting instruction is "add %ecx, %edx." The parameters of the instruction are the current values of emulated subject registers %ecx 177 and %edx 179. The "@" symbol preceding the subject register uses 177, 179 indicate that the values of the subject registers are retrieved from the global register store, from the locations corresponding to % ecx and % edx, respectively, as these particular subject registers were not previously loaded by the current basic block. These parameter values are then stored in the first and second flag parameter abstract registers 169, 171. The result of the addition operation 175 is stored in the flag result abstract register 173.

After the IR tree is generated, the corresponding target code 21 is generated based on the IR. The process of generating target code 21 from a generic IR is well understood in the art. Target code is inserted at the end of the translated block to save the abstract registers, including those for the flag result 173 and the flag parameters 169, 171, to the global register store 27. After the target code is generated, it is then executed, step 155.

FIG. 2 shows an example of translation and execution interlaced. The translator 19 first generates translated code 21 based on the subject instructions 17 of a first basic block 153, then the translated code for basic block 153 is executed. At the end of the first basic block 153, the translated code 21 returns control to the translator 19, which then translates a second basic block 159, including generating a respective IR tree 165 with appropriate abstract registers 181, 183, 185, 187, and instruction elements 189, 191, 193 and 195. The translated code 21 for the second basic block 159 is then executed, at step 157. At the end of the execution of the second basic block 159, the translated code returns control to the translator 19, which then translates the next basic block, and so forth.

Thus, a subject program running under the translator 19 has two different types of code that execute in an interleaved manner: the translator code 19 and the translated code 21. The translator code 19 is generated by a compiler, prior to run-time, based on the high-level source code implementation of the translator 19. The translated code 21 is generated by the translator code 19, throughout run-time, based on the subject code 17 of the program being translated.

The representation of the subject processor state is likewise divided between the translator 19 and translated code 21 components. The translator 19 stores subject processor state in a variety of explicit programming language devices such as variables and/or objects; the compiler used to compile the translator determines how the state and operations are implemented in target code. The translated code 21, by comparison, stores subject processor state implicitly in target registers and memory locations, which are manipulated directly by the target instructions of the translated code 21.

For example, the low-level representation of the global register store 27 is simply a region of allocated memory. This is how the translated code 21 sees and interacts with the abstract registers, by saving and restoring between the defined memory region and various target registers. In the source code of the translator 19, however, the global register store 27 is a data array or an object which can be accessed and manipulated at a higher level. With respect to the translated code 21, there simply is no high-level representation.

In some cases, subject processor state which is static or statically determinable in the translator 19 is encoded directly into the translated code 21 rather than being calculated dynamically. For example, the translator 19 may generate translated code 21 that is specialized on the instruction type of the last flag-affecting instruction, meaning that the translator would generate different target code for the same basic block if the instruction type of the last flag-affecting instruction changed.

Figure 3:
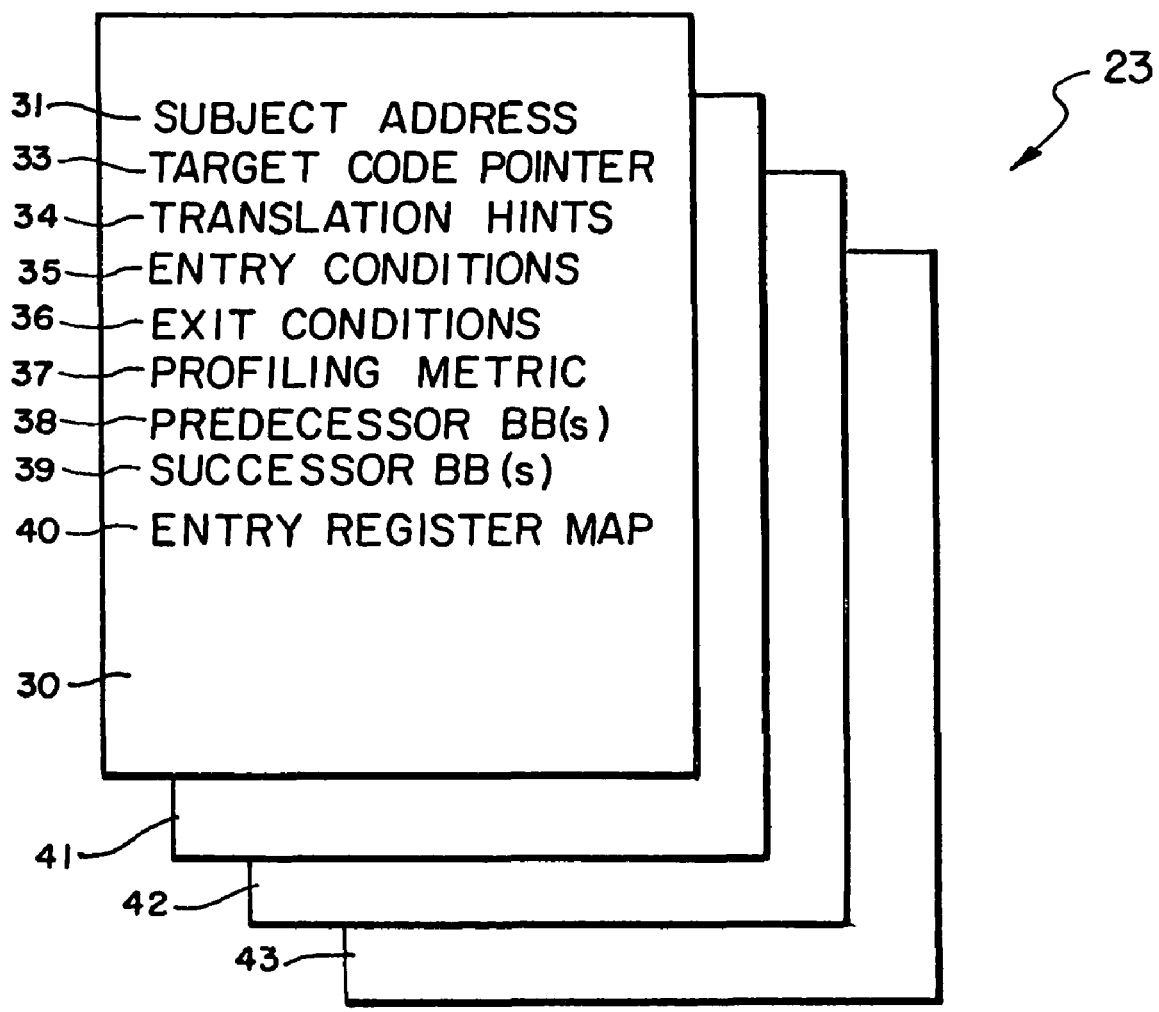
FIG. 3 is a schematic diagram illustrating a basic block data structure and cache according to an illustrative embodiment of the invention.

The translator 19 contains data structures corresponding to each basic block translation, which particularly facilitates extended basic block, isoblock, group block, and cached translation state optimizations as hereafter described. FIG. 3 illustrates such a basic block data structure 30, which includes a subject address 31, a target code pointer 33 (i.e., the target address of the translated code), translation hints 34, entry and exit conditions 35, a profiling metric 37, references to the data structures of the predecessor and successor basic blocks 38, 39, and an entry register map 40. FIG. 3 further illustrates the basic block cache 23, which is a collection of basic block data structures, e.g., 30, 41, 42, 43, 44 . . . indexed by subject address. In one embodiment, the data corresponding to a particular translated basic block may be stored in a C++ object. The translator creates a new basic block object as the basic block is translated.

The subject address 31 of the basic block is the starting address of that basic block in the memory space of the subject program 17, meaning the memory location where the basic block would be located if the subject program 17 were running on the subject architecture. This is also referred to as the subject starting address. While each basic block corresponds to a range of subject addresses (one for each subject instruction), the subject starting address is the subject address of the first instruction in the basic block.

The target address 33 of the basic block is the memory location (starting address) of the translated code 21 in the target program. The target address 33 is also referred to as the target code pointer, or the target starting address. To execute a translated block, the translator 19 treats the target address as a function pointer which is dereferenced to invoke (transfer control to) the translated code.

The basic block data structures 30, 41, 42, 43, . . . are stored in the basic block cache 23, which is a repository of basic block objects organized by subject address. When the translated code of a basic block finishes executing, it returns control to the translator 19 and also returns the value of the basic block's destination (successor) subject address 31 to the translator. To determine if the successor basic block has already been translated, the translator 19 compares the destination subject address 31 against the subject addresses 31 of basic blocks in the basic block cache 23 (i.e., those that have already been translated). Basic blocks which have not been yet translated are translated and then executed. Basic blocks which have already been translated (and which have compatible entry conditions, as discussed below) are simply executed. Over time, many of the basic blocks encountered will already have been translated, which causes the incremental translation cost to decrease. As such, the translator 19 gets faster over time, as fewer and fewer blocks require translation.

Extended Basic Blocks

One optimization applied according to the illustrative embodiment is to increase the scope of code generation by a technique referred to as "extended basic blocks." In cases where a basic block A has only one successor block (e.g., basic block B), the translator may be able to statically determine (when A is decoded) the subject address of B. In such cases, basic blocks A and B are combined into a single block (A') which is referred to as an extended basic block. Put differently, the extended basic block mechanism can be applied to unconditional jumps whose destination is statically determinable; if a jump is conditional or if the destination cannot be statically determined, then a separate basic block must be formed. An extended basic block may still formally be a basic block, because after the intervening jump from A to B is removed, the code of block A' has only a single flow of control, and therefore no synchronization is necessary at the AB boundary.

Even if A has multiple possible successors including B, extended basic blocks may be used to extend A into B for a particular execution in which B is the actual successor and B's address is statically determinable.

Statically determinable addresses are those the translator can determine at decode-time. During construction of a block's IR forest, an IR tree is constructed for the destination subject address, which is associated with the destination address abstract register. If the value of destination address IR tree is statically determinable (i.e., does not depend on dynamic or run-time subject register values), then the successor block is statically determinable. For example, in the case of an unconditional jump instruction, the destination address (i.e., the subject starting address of the successor block) is implicit in the jump instruction itself, the subject address of the jump instruction plus the offset encoded in the jump instruction equals the destination address. Likewise, the optimizations of constant folding (e.g., X+(2+3)=>X+5) and expression folding (e.g., (X*5)*10=>X*50) may cause an otherwise "dynamic" destination address to become statically determinable. The calculation of the destination address thus consists of extracting the constant value from the destination address IR.

When extended basic block A' is created, the translator subsequently treats it the same as any other basic block when performing IR generation, optimizations, and code generation. Because the code generation algorithms are operating on a larger scope (i.e., the code of basic blocks A and B combined), the translator 19 generates more optimal code.

As one of ordinary skill in the art will appreciate, decoding is the process of extracting individual subject instructions from the subject code. The subject code is stored as an unformatted byte stream (i.e., a collection of bytes in memory). In the case of subject architectures with variable-length instructions (e.g., X86), decoding first requires the identification of instruction boundaries; in the case of fixed-length instruction architectures, identifying instruction boundaries is trivial (e.g., on the MIPS, every four bytes is an instruction). The subject instruction format is then applied to the bytes that constitute a given instruction to extract the instruction data (i.e., the instruction type, operand register numbers, immediate field values, and any other information encoded in the instruction). The process of decoding machine instructions of a known architecture from an unformatted byte stream using that architecture's instruction format is well understood in the art.

Figure 4:
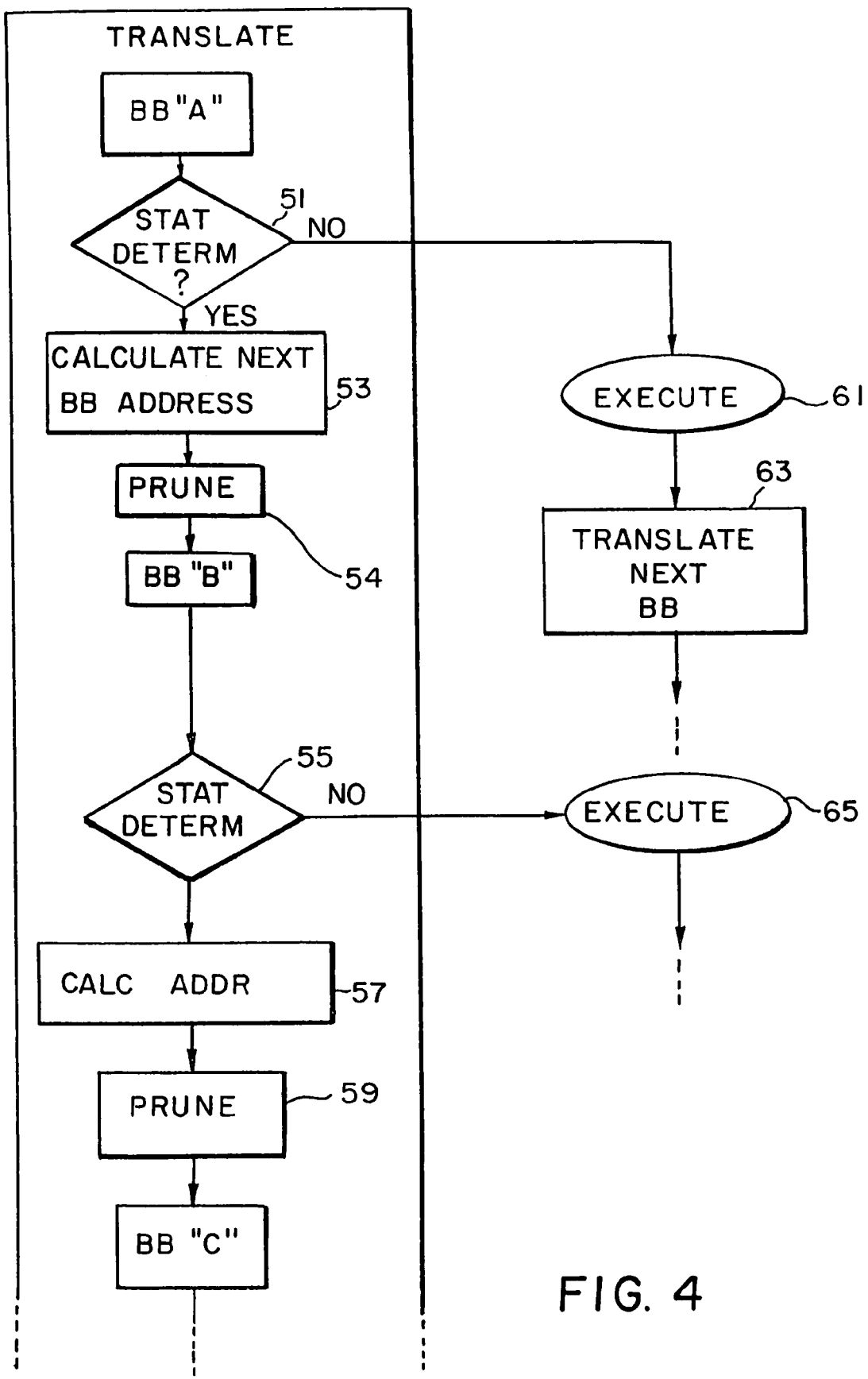
FIG. 4 is a flow diagram illustrating an extended basic block process.

FIG. 4 illustrates the creation of an extended basic block. A set of constituent basic blocks which is eligible to become an extended basic block is detected when the earliest eligible basic block (A) is decoded. If the translator 19 detects that A's successor (B) is statically determinable 51, it calculates B's starting address 53 and then resumes the decoding process at the starting address of B. If B's successor (C) is determined to be statically determinable 55, the decoding process proceeds to the starting address of C, and so forth. Of course, if a successor block is not statically determinable then normal translation and execution resume 61, 63, 65.

During all basic block decoding, the working IR forest includes an IR tree to calculate the subject address 31 of the current block's successor (i.e., the destination subject address; the translator has a dedicated abstract register for the destination address). In the case of an extended basic block, to compensate for the fact that intervening jumps are being eliminated, as each new constituent basic block is assimilated by the decoding process, the IR tree for the calculation of that block's subject address is pruned 54 (FIG. 4). In other words, when the translator 19 statically calculates B's address and decoding resumes at B's starting address, the IR tree corresponding to the dynamic calculation of B's subject address 31 (which was constructed in the course of decoding A) is pruned; when decoding proceeds to the starting address of C, the IR tree corresponding to C's subject address is pruned 59; and so forth. "Pruning" an IR tree means to remove any IR nodes which are depended on by the destination address abstract register and by no other abstract registers. Put differently, pruning breaks the link between the IR tree and the destination abstract register; any other links to the same IR tree remain unaffected. In some cases, a pruned IR tree may also be depended on by another abstract register, in which case the IR tree remains to preserve the subject program's execution semantics.

To prevent code explosion (traditionally, the mitigating factor against such code specialization techniques), the translator limits extended basic blocks to some maximum number of subject instructions. In one embodiment, extended basic blocks are limited to a maximum of 200 subject instructions.

Isoblocks

Another optimization implemented in the illustrated embodiment is so-called "isoblocking." According to this technique, translations of basic blocks are parameterized, or specialized, on a compatibility list, which is a set of variable conditions that describe the subject processor state and the translator state. The compatibility list is different for each subject architecture, to take into account different architectural features. The actual values of the compatibility conditions at the entry and exit of a particular basic block translation are referred to as entry conditions and exit conditions, respectively.

If execution reaches a basic block which has already been translated but the previous translation's entry conditions differ from the current working conditions (i.e., the exit conditions of the previous block), then the basic block must be translated again, this time based on the current working conditions. The result is that the same subject code basic block is now represented by multiple target code translations. These different translations of the same basic block are referred to as isoblocks.

To support isoblocks, the data associated with each basic block translation includes one set of entry conditions 35 and one set of exit conditions 36 (FIG. 3). In one embodiment, the basic block cache 23 is organized first by subject address 31 and then by entry conditions 35, 36 (FIG. 3). In another embodiment, when the translator queries the basic block cache 23 for a subject address 31, the query may return multiple translated basic blocks (isoblocks).

Figure 5:
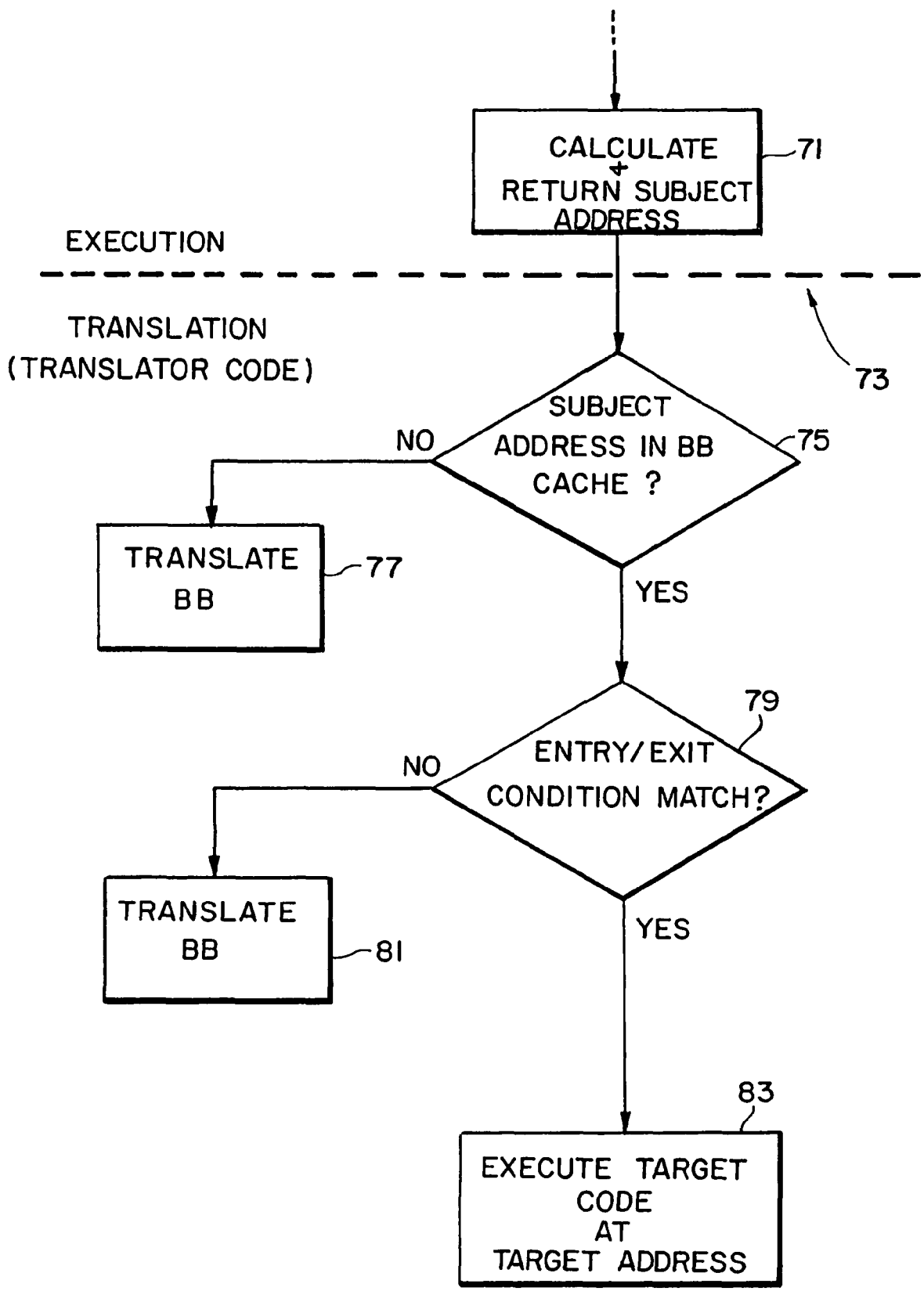
FIG. 5 is a flow diagram illustrating isoblocking.

FIG. 5 illustrates the use of isoblocks. At the end of a first translated block's execution, the translated code 21 calculates and returns the subject address of the next block (i.e., the successor) 71. Control is then returned to the translator 19, as demarcated by dashed line 73. In the translator 19, the basic block cache 23 is queried using the returned subject address 31, step 75. The basic block cache may return zero, one, or more than one basic block data structures with the same subject address 31. If the basic block cache 23 returns zero data structures (meaning that this basic block has not yet been translated), then the basic block must be translated, step 77, by the translator 19. Each data structure returned by the basic block cache 23 corresponds to a different translation (isoblock) of the same basic block of subject code. As illustrated at decision diamond 79, if the current exit conditions (of the first translated block) do not match the entry conditions of any of the data structures returned by the basic block cache 23, then the basic block must be translated again, step 81, this time parameterized on those exit conditions. If the current exit conditions match the entry conditions of one of the data structures returned by the basic block cache 23, then that translation is compatible and can be executed without re-translation, step 83. In the illustrative embodiment, the translator 19 executes the compatible translated block by dereferencing the target address as a function pointer.

As noted above, basic block translations are preferably parameterized on a compatibility list. Exemplary compatibility lists will now be described for both the X86 and PowerPC architectures.

An illustrative compatibility list for the X86 architecture includes representations of: (1) lazy propagation of subject registers; (2) overlapping abstract registers; (3) type of pending condition code flag-affecting instruction; (4) lazy propagation of condition code flag-affecting instruction parameters; (5) direction of string copy operations; (6) floating point unit (FPU) mode of the subject processor; and (7) modifications of the segment registers.

The compatibility list for the X86 architecture includes representations of any lazy propagation of subject registers by the translator, also referred to as register aliasing. Register aliasing occurs when the translator knows that two subject registers contain the same value at a basic block boundary. As long as the subject register values remain the same, only one of the corresponding abstract registers is synchronized, by saving it to the global register store. Until the saved subject register is overwritten, references to the non-saved register simply use or copy (via a move instruction) the saved register. This avoids two memory accesses (save+restore) in the translated code.

The compatibility list for the X86 architecture includes representations of which of the overlapping abstract registers are currently defined. In some cases, the subject architecture contains multiple overlapping subject registers which the translator represents using multiple overlapping abstract registers. For example, variable-width subject registers are represented using multiple overlapping abstract registers, one for each access size. For example, the X86 "EAX" register can be accessed using any of the following subject registers, each of which has a corresponding abstract register: EAX (bits 31 . . . 0), AX (bits 15 . . . 0), AH (bits 15. . . 8), and AL (bits 7 . . . 0).

The compatibility list for the X86 architecture includes representations of, for each integer and floating point condition code flag, whether the flag value is normalized or pending, and if pending the type of the pending flag-affecting instruction.

The compatibility list for the X86 architecture includes representations of register aliasing for condition code flag-affecting instruction parameters (if some subject register still holds the value of a flag-affecting instruction parameter, or if the value of the second parameter is the same as the first). The compatibility list also includes representations of whether the second parameter is a small constant (i.e., an immediate instruction candidate), and if so its value.

The compatibility list for the X86 architecture includes a representation of the current direction of string copy operations in the subject program. This condition field indicates whether string copy operations move upward or downward in memory. This supports code specialization of "strcpy()" function calls, by parameterizing translations on the function's direction argument.

The compatibility list for the X86 architecture includes a representation of the FPU mode of the subject processor. The FPU mode indicates whether subject floating-point instructions are operating in 32- or 64-bit mode.

The compatibility list for the X86 architecture includes a representation of modifications of the segment registers. All X86 instruction memory references are based on one of six memory segment registers: CS (code segment), DS (data segment), SS (stack segment), ES (extra data segment), FS (general purpose segment), and GS (general purpose segment). Under normal circumstances an application will not modify the segment registers. As such, code generation is by default specialized on the assumption that the segment register values remain constant. It is possible, however, for a program to modify its segment registers, in which case the corresponding segment register compatibility bit will be set, causing the translator to generate code for generalized memory accesses using the appropriate segment register's dynamic value.

An illustrative embodiment of a compatibility list for the PowerPC architecture includes representations of: (1) mangled registers; (2) link value propagation; (3) type of pending condition code flag-affecting instruction; (4) lazy propagation of condition code flag-affecting instruction parameters; (5) condition code flag value aliasing; and (6) summary overflow flag synchronization state.

The compatibility list for the PowerPC architecture includes a representation of mangled registers. In cases where the subject code contains multiple consecutive memory accesses using a subject register for the base address, the translator may translate those memory accesses using a mangled target register. In cases where subject program data is not located at the same address in target memory as it would have been in subject memory, the translator must include a target offset in every memory address calculated by the subject code. While the subject register contains the subject base address, a mangled target register contains the target address corresponding to that subject base address (i.e., subject base address+target offset). With register mangling, memory accesses can be translated more efficiently by applying the subject code offsets directly to the target base address, stored in the mangled register. By comparison, without the mangled register mechanism this scenario would require additional manipulation of the target code for each memory access, at the cost of both space and execution time. The compatibility list indicates which abstract registers if any are mangled.

The compatibility list for the PowerPC architecture includes a representation of link value propagation. For leaf functions (i.e., functions that call no other functions), the function body may be extended (as with the extended basic block mechanism discussed above) into the call/return site. Hence, the function body and the code that follows the function's return are translated together. This is also referred to as function return specialization, because such a translation includes code from, and is therefore specialized on, the function's return site. Whether a particular block translation used link value propagation is reflected in the exit conditions. As such, when the translator encounters a block whose translation used link value propagation, it must evaluate whether the current return site will be the same as the previous return site. Functions return to the same location from which they are called, so the call site and return site are effectively the same (offset by one or two instructions). The translator can therefore determine whether the return sites are the same by comparing the respective call sites; this is equivalent to comparing the subject addresses of the respective predecessor blocks (of the function block's prior and current executions). As such, in embodiments that support link value propagation, the data associated with each basic block translation includes a reference to the predecessor block translation (or some other representation of the predecessor block's subject address).

The compatibility list for the PowerPC architecture includes representations of, for each integer and floating point condition code flag, whether the flag value is normalized or pending, and if pending the type of the pending flag-affecting instruction.

The compatibility list for the PowerPC architecture includes representations of register aliasing for flag-affecting instruction parameters (if flag-affecting instruction parameter values happen to be live in a subject register, or if the value of the second parameter is the same as the first). The compatibility list also includes representations of whether the second parameter is a small constant (i.e., an immediate instruction candidate), and if so its value.

The compatibility list for the PowerPC architecture includes representations of register aliasing for the PowerPC condition code flag values. The PowerPC architecture includes instructions for explicitly loading the entire set of PowerPC flags into a general purpose (subject) register. This explicit representation of the subject flag values in subject registers interferes with the translator's condition code flag emulation optimizations. The compatibility list contains a representation of whether the flag values are live in a subject register, and if so which register. During IR generation, references to such a subject register while it holds the flag values are translated into references to the corresponding abstract registers. This mechanism eliminates the need to explicitly calculate and store the subject flag values in a target register, which in turn allows the translator to apply the standard condition code flag optimizations.

The compatibility list for the PowerPC architecture includes a representation of summary overflow synchronization. This field indicates which of the eight summary overflow condition bits are current with the global summary overflow bit. When one of the PowerPC's eight condition fields is updated, if the global summary overflow is set, it is copied to the corresponding summary overflow bit in the particular condition code field.

Translation Hints

Another optimization implemented in the illustrative embodiment employs the translation hints 34 of the basic block data structure of FIG. 3. This optimization proceeds from a recognition that there is static basic block data which is specific to a particular basic block, but which is the same for every translation of that block. For some types of static data which are expensive to calculate, it is more efficient for the translator to calculate the data once, during the first translation of the corresponding block, and then store the result for future translations of the same block. Because this data is the same for every translation of the same block, it does not parameterize translation and therefore it is not formally part of the block's compatibility list (discussed above). Expensive static data is still stored in the data associated with each basic block translation, however, as it is cheaper to save the data than it is to recalculate. In later translations of the same block, even if the translator 19 cannot reuse a prior translation, the translator 19 can take advantage of these "translation hints" (i.e., the cached static data) to reduce the translation cost of the second and later translations.

In one embodiment, the data associated with each basic block translation includes translation hints, which are calculated once during the first translation of that block and then copied (or referred to) on each subsequent translation.

For example, in a translator 19 implemented in C++, translation hints may be implemented as a C++ object, in which case the basic block objects which correspond to different translations of the same block would each store a reference to the same translation hints object. Alternatively, in a translator implemented in C++, the basic block cache 23 may contain one basic block object per subject basic block (rather than per translation), with each such object containing or holding a reference to the corresponding translation hints; such basic block objects also contain multiple references to translation objects that correspond to different translations of that block, organized by entry conditions.

Exemplary translation hints for the X86 architecture include representations of: (1) initial instruction prefixes; and (2) initial repeat prefixes. Such translation hints for the X86 architecture particularly include a representation of how many prefixes the first instruction in the block has. Some X86 instructions have prefixes which modify the operation of the instruction. This architectural feature makes it difficult (i.e., expensive) to decode an X86 instruction stream. Once the number of initial prefixes is determined during the first decoding of the block, that value is then stored by the translator 19 as a translation hint, so that subsequent translations of the same bock do not need to determine it anew.

The translation hints for the X86 architecture further include a representation of whether the first instruction in the block has a repeat prefix. Some X86 instructions such as string operations have a repeat prefix which tells the processor to execute that instruction multiple times. The translation hints indicate whether such a prefix is present, and if so its value.

In one embodiment, the translation hints associated with each basic block additionally include the entire IR forest corresponding to that basic block. This effectively caches all of the decoding and IR generation performed by the frontend. In another embodiment, the translation hints include the IR forest as it exists prior to being optimized. In another embodiment, the IR forest is not cached as a translation hint, in order to conserve the memory resources of the translated program.

Group Blocks

Another optimization implemented in the illustrative translator embodiment is directed to eliminating program overhead resulting from the necessity to synchronize all abstract registers at the end of execution of each translated basic block. This optimization is referred to as group block optimization.

As discussed above, in basic block mode (e.g., FIG. 2), state is passed from one basic block to the next using a memory region which is accessible to all translated code sequences, namely, a global register store 27. The global register store 27 is a repository for abstract registers, each of which corresponds to and emulates the value of a particular subject register or other subject architectural feature. During the execution of translated code 21, abstract registers are held in target registers so that they may participate in instructions. During the execution of translator code 21, abstract register values are stored in the global register store 27 or target registers 15.

Thus, in basic block mode such as illustrated in FIG. 2, all abstract registers must be synchronized at the end of each basic block for two reasons: (1) control returns to the translator code 19, which potentially overwrites all target registers; and (2) because code generation only sees one basic block at a time, the translator 19 must assume that all abstract registers values are live (i.e., will be used in subsequent basic blocks) and therefore must be saved. The goal of the group block optimization mechanism is to reduce synchronization across basic block boundaries that are crossed frequently, by translating multiple basic blocks as a contiguous whole. By translating multiple basic blocks together, the synchronization at block boundaries can be minimized if not eliminated.

Group block construction is triggered when the current block's profiling metric reaches a trigger threshold. This block is referred to as the trigger block. Construction can be separated into the following steps (FIG. 6): (1) selecting member blocks 71; (2) ordering member blocks 73; (3) global dead code elimination 75; (4) global register allocation 77; and (5) code generation 79. The first step 71 identifies the set of blocks that are to be included in the group block by performing a depth-first search (DFS) traversal of the program's control flow graph, beginning with the trigger block and tempered by an inclusion threshold and a maximum member limit. The second step 73 orders the set of blocks and identifies the critical path through the group block, to enable efficient code layout that minimizes synchronization code and reduces branches. The third and fourth steps 75, 77 perform optimizations. The final step 79 generates target code for all member blocks in turn, producing efficient code layout with efficient register allocation.

Figure 6:
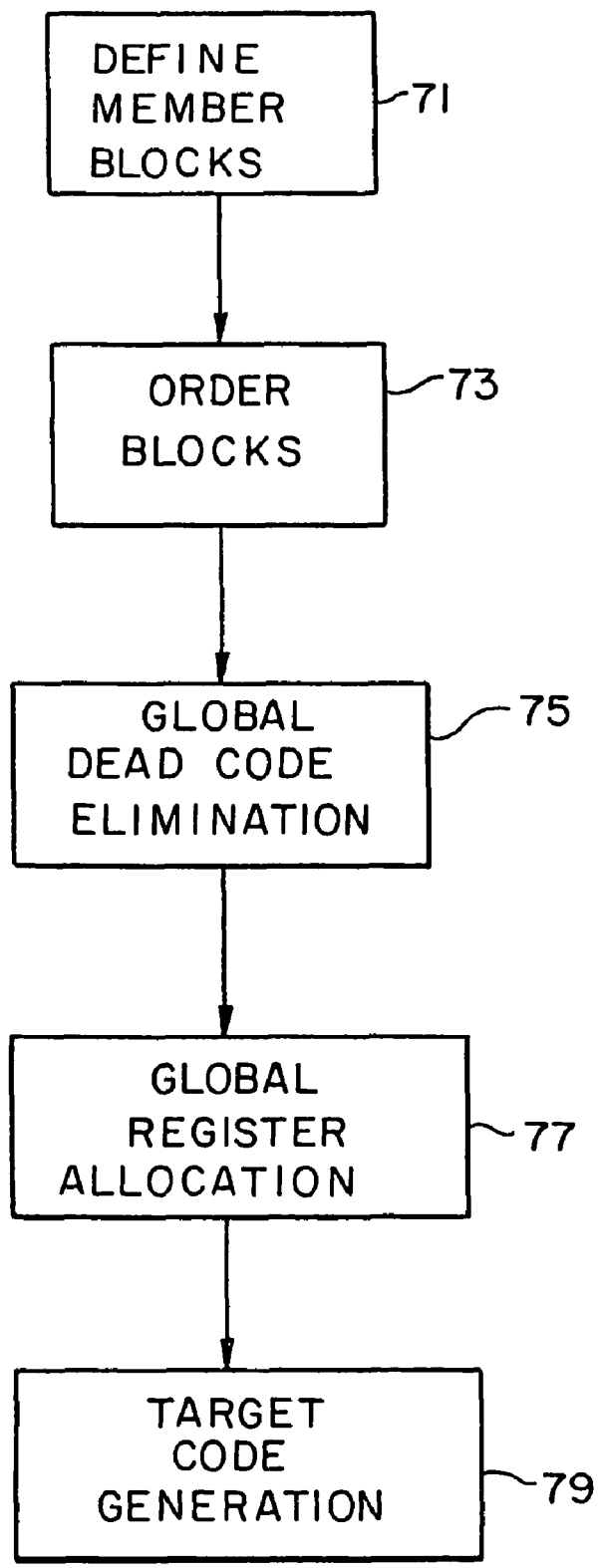
FIG. 6 is a flow diagram illustrating group blocking and attendant optimizations.

In construction of a group block and generation of target code therefrom, the translator code 19 implements the steps illustrated in FIG. 6. When the translator 19 encounters a basic block that was previously translated, prior to executing that block, the translator 19 checks the block's profiling metric 37 (FIG. 3) against the trigger threshold. The translator 19 begins group block creation when a basic block's profiling metric 37 exceeds the trigger threshold. The translator 19 identifies the members of the group block by a traversal of the control flow graph, starting with the trigger block and tempered by the inclusion threshold and maximum member limit. Next, the translator 19 creates an ordering of the member blocks, which identifies the critical path through the group block. The translator 19 then performs global dead code elimination; the translator 19 gathers register liveness information for each member block, using the IR corresponding to each block. Next, the translator 19 performs global register allocation according to an architecture-specific policy, which defines a partial set of uniform register mappings for all member blocks. Finally, the translator 19 generates target code for each member block in order, consistent with the global register allocation constraints and using the register liveness analyses.

As noted above, the data associated with each basic block includes a profiling metric 37. In one embodiment, the profiling metric 37 is execution count, meaning that the translator 19 counts the number of times a particular basic block has been executed; in this embodiment, the profiling metric 37 is represented as an integer count field (counter). In another embodiment, the profiling metric 37 is execution time, meaning that the translator 19 keeps a running aggregate of the execution time for all executions of a particular basic block, such as by planting code in the beginning and end of a basic block to start and stop, respectively, a hardware or software timer; in this embodiment, the profiling metric 37 uses some representation of the aggregate execution time (timer). In another embodiment, the translator 19 stores multiple types of profiling metrics 37 for each basic block. In another embodiment, the translator 19 stores multiple sets of profiling metrics 37 for each basic block, corresponding to each predecessor basic block and/or each successor basic block, such that distinct profiling data is maintained for different control paths. In each translator cycle (i.e., the execution of translator code 19 between executions of translated code 21), the profiling metric 37 for the appropriate basic block is updated.

In embodiments that support group blocks, the data associated with each basic block additionally includes references 38, 39 to the basic block objects of known predecessors and successors. These references in aggregate constitute a control-flow graph of all previously executed basic blocks. During group block formation, the translator 19 traverses this control-flow graph to determine which basic blocks to include in the group block under formation.

Group block formation in the illustrative embodiment is based on three thresholds: a trigger threshold, an inclusion threshold, and a maximum member limit. The trigger threshold and the inclusion threshold refer to the profiling metric 37 for each basic block. In each translator cycle, the profiling metric 37 of the next basic block is compared to the trigger threshold. If the metric 37 meets the trigger threshold then group block formation begins. The inclusion threshold is then used to determine the scope of the group block, by identifying which successor basic blocks to include in the group block. The maximum member limit defines the upper limit on the number of basic blocks to be included in any one group block.

When the trigger threshold is reached for basic block A, a new group block is formed with A as the trigger block. The translator 19 then begins the definition traversal, a traversal of A's successors in the control-flow graph to identify other member blocks to include. When traversal reaches a given basic block, its profiling metric 37 is compared to the inclusion threshold. If the metric 37 meets the inclusion threshold, that basic block is marked for inclusion and the traversal continues to the block's successors. If the block's metric 37 is below the inclusion threshold, that block is excluded and its successors are not traversed. When traversal ends (i.e., all paths either reach an excluded block or cycle back to an included block, or the maximum member limit is reached), the translator 19 constructs a new group block based on all of the included basic blocks.

In embodiments that use isoblocks and group blocks, the control flow graph is a graph of isoblocks, meaning that different isoblocks of the same subject block are treated as different blocks for the purposes of group block creation. Thus, the profiling metrics for different isoblocks of the same subject block are not aggregated.

In another embodiment, isoblocks are not used in basic block translation but are used in group block translation, meaning that non-group basic block translations are generalized (not specialized on entry conditions). In this embodiment, a basic block's profiling metric is disaggregated by the entry conditions of each execution, such that distinct profiling information is maintained for each theoretical isoblock (i.e., for each distinct set of entry conditions). In this embodiment, the data associated with each basic block includes a profiling list, each member of which is a three-item set containing: (1) a set of entry conditions, (2) a corresponding profiling metric, and (3) a list of corresponding successor blocks. This data maintains profiling and control path information for each set of entry conditions to the basic block, even though the actual basic block translation is not specialized on those entry condition. In this embodiment, the trigger threshold is compared to each profiling metric within a basic block's profiling metric list. When the control flow graph is traversed, each element in a given basic block's profiling list is treated as a separate node in the control flow graph. The inclusion threshold is therefore compared against each profiling metric in the block's profiling list. In this embodiment, group blocks are created for particular hot isoblocks (specialized to particular entry conditions) of hot subject blocks, but other isoblocks of those same subject blocks are executed using the general (non-isoblock) translations of those blocks.

After the definition traversal, the translator 19 performs an ordering traversal, step 73; FIG. 6, to determine the order in which member blocks will be translated. The order of the member blocks affects both the instruction cache behavior of the translated code 21 (hot paths should be contiguous) and the synchronization necessary on member block boundaries (synchronization should be minimized along hot paths). In one embodiment, the translator 19 performs the ordering traversal using an ordered depth-first search (DFS) algorithm, ordered by execution count. Traversal starts at the member block having the highest execution count. If a traversed member block has multiple successors, the successor with the higher execution count is traversed first.

One of ordinary skill in the art will appreciate that group blocks are not formal basic blocks, as they may have internal control branches, multiple entry points, and/or multiple exit points.

Once a group block has been formed, a further optimization may be applied to it, referred to herein as "global dead code elimination." Such global dead code elimination employs the technique of liveness analysis. Global dead code elimination is the process of removing redundant work from the IR across a group of basic blocks.

Generally, subject processor state must be synchronized on translation scope boundaries. A value, such as a subject register, is said to be "live" for the range of code starting with its definition and ending with its last use prior to being re-defined (overwritten); hence, the analysis of values' (e.g., temporary values in the context of IR generation, target registers in the context of code generation, or subject registers in the context of translation) uses and definitions is known in the art as liveness analysis. Whatever knowledge (i.e., liveness analysis) the translator has regarding the uses (reads) and definitions (writes) of data and state is limited to its translation scope; the rest of the program is an unknown. More specifically, because the translator does not know which subject registers will be used outside the scope of translation (e.g., in a successor basic block), it must assume that all registers will be used. As such, the values (definitions) of any subject registers which were modified within a given basic block must be saved (stored to the global register store 27) at the end of that basic block, against the possibility of their future use. Likewise, all subject registers whose values will be used in a given basic block must be restored (loaded from the global register store 27) at the beginning of that basic block; i.e., the translated code for a basic block must restore a given subject register prior to its first use within that basic block.

The general mechanism of IR generation involves an implicit form of "local" dead code elimination, whose scope is localized to only a small group of IR nodes at once. For example, a common subexpression A in the subject code would be represented by a single IR tree for A with multiple parent nodes, rather than multiple instances of the expression tree A itself. The "elimination" is implicit in the fact that one IR node can have links to multiple parent nodes. Likewise, the use of abstract registers as IR placeholders is an implicit form of dead code elimination. If the subject code for a given basic block never defines a particular subject register, then at the end of IR generation for that block, the abstract register corresponding to that subject register will refer to an empty IR tree. The code generation phase recognizes that, in this scenario, the appropriate abstract register need not be synchronized with the global register store. As such, local dead code elimination is implicit in the IR generation phase, occurring incrementally as IR nodes are created.

In contrast to local dead code elimination, a "global" dead code elimination algorithm is applied to a basic block's entire IR expression forest. Global dead code elimination according to the illustrative embodiment requires liveness analysis, meaning analysis of subject register uses (reads) and subject register definitions (writes) within the scope of each basic block in a group block, to identify live and dead regions. The IR is transformed to remove dead regions and thereby reduce the amount of work that must be performed by the target code. For example, at a given point in the subject code, if the translator 19 recognizes or detects that a particular subject register will be defined (overwritten) before its next use, the subject register is said to be dead at all points in the code up to that preempting definition. In terms of the IR, subject registers which are defined but never used before being re-defined are dead code which can be eliminated in the IR phase without ever spawning target code. In terms of target code generation, target registers which are dead can be used for other temporary or subject register values without spilling.

In group block global dead code elimination, liveness analysis is performed on all member blocks. Liveness analysis generates the IR forest for each member block, which is then used to derive the subject register liveness information for that block. IR forests for each member block are also needed in the code generation phase of group block creation. Once the IR for each member block is generated in liveness analysis, it can either be saved for subsequent use in code generation, or it can be deleted and re-generated during code generation.

Group block global dead code elimination can effectively "transform" the IR in two ways. First, the IR forest generated for each member block during liveness analysis can be modified, and then that entire IR forest can be propagated to (i.e., saved and reused during) the code generation phase; in this scenario, the IR transformations are propagated through the code generation phase by applying them directly to the IR forest and then saving the transformed IR forest. In this scenario, the data associated with each member block includes liveness information (to be additionally used in global register allocation), and the transformed IR forest for that block.

Alternatively and preferably, the step of global dead code elimination which transforms the IR for a member block is performed during the final code generation phase of group block creation, using liveness information created earlier. In this embodiment, the global dead code transformations can be recorded as list of "dead" subject registers, which is then encoded in the liveness information associated with each member block. The actual transformation of the IR forest is thus performed by the subsequent code generation phase, which uses the dead register list to prune the IR forest. This scenario allows the translator to generate the IR once during liveness analysis, then throw the IR away, and then re-generate the same IR during the code generation, at which point the IR is transformed using the liveness analysis (i.e., global dead code elimination is applied to the IR itself). In this scenario, the data associated with each member block includes liveness information, which includes a list of dead subject registers. The IR forest is not saved. Specifically, after the IR forest is (re)generated in the code generation phase, the IR trees for dead subject registers (which are listed in the dead subject register list within the liveness information) are pruned.

In one embodiment, the IR created during liveness analysis is thrown away after the liveness information is extracted, to conserve memory resources. The IR forests (one per member block) are recreated during code generation, one member block at a time. In this embodiment, the IR forests for all member blocks do not coexist at any point in translation. However, the two versions of the IR forests, created during liveness analysis and code generation, respectively, are identical, as they are generated from the subject code using the same IR generation process.

In another embodiment, the translator creates an IR forest for each member block during liveness analysis, and then saves the IR forest, in the data associated with each member block, to be reused during code generation. In this embodiment, the IR forests for all member blocks coexist, from the end of liveness analysis (in the global dead code elimination step) to code generation. In one alternative of this embodiment, no transformations or optimizations are performed on the IR during the period from its initial creation (during liveness analysis) and its last use (code generation).

In another embodiment, the IR forests for all member blocks are saved between the steps of liveness analysis and code generation, and inter-block optimizations are performed on the IR forests prior to code generation. In this embodiment, the translator takes advantage of the fact that all member block IR forests coexist at the same point in translation, and optimizations are performed across the IR forests of different member blocks which transform those IR forests. In this case, the IR forests used in code generation may not be identical to the IR forests used in liveness analysis (as in the two embodiments described above), because the IR forests have been subsequently transformed by inter-block optimizations. In other words, the IR forests used in code generation may be different than the IR forests that would result from generating them anew one member block at a time.

In group block global dead code elimination, the scope of dead code detection is increased by the fact that liveness analysis is applied to multiple blocks at the same time. Hence, if a subject register is defined in the first member block, and then redefined in the third member block (with no intervening uses or exit points), the IR tree for the first definition can be eliminated from the first member block. By comparison, under basic block code generation, the translator 19 would be unable to detect that this subject register was dead.

As noted above, one goal of group block optimization is to reduce or eliminate the need for register synchronization at basic block boundaries. Accordingly, a discussion of how register allocation and synchronization is achieved by the translator 19 during group blocking is now provided.

Register allocation is the process of associating an abstract (subject) register with a target register. Register allocation is a necessary component of code generation, as abstract register values must reside in target registers to participate in target instructions. The representation of these allocations (i.e., mappings) between target registers and abstract registers is referred to as a register map. During code generation, the translator 19 maintains a working register map, which reflects the current state of register allocation (i.e., the target-to-abstract register mappings actually in existence at a given point in the target code). Reference will be had hereafter to an exit register map which is, abstractly, a snapshot of the working register map on exit from a member block. However, since the exit register map is not needed for synchronization, it is not recorded so it is purely abstract. The entry register map 40 (FIG. 3) is a snapshot of the working register map on entry to a member block, which is necessary to record for synchronization purposes.

Also, as discussed above, a group block contains multiple member blocks, and code generation is performed separately for each member block. As such, each member block has its own entry register map 40 and exit register map, which reflect the allocation of particular target registers to particular subject registers at the beginning and end, respectively, of the translated code for that block.

Code generation for a group member block is parameterized by its entry register map 40 (the working register map on entry), but code generation also modifies the working register map. The exit register map for a member block reflects the working register map at the end of that block, as modified by the code generation process. When the first member block is translated, the working register map is empty (subject to global register allocation, discussed below). At the end of translation for the first member block, the working register map contains the register mappings created by the code generation process. The working register map is then copied into the entry register maps 40 of all successor member blocks.

At the end of code generation for a member block, some abstract registers may not require synchronization. Register maps allow the translator 19 to minimize synchronization on member block boundaries, by identifying which registers actually require synchronization. By comparison, in the (non-group) basic block scenario all abstract registers must be synchronized at the end of every basic block.

At the end of a member block, three synchronization scenarios are possible based on the successor. First, if the successor is a member block which has not yet been translated, its entry register map 40 is defined to be the same as the working register map, with the consequence that no synchronization is necessary. Second, if the successor block is external to the group, then all abstract registers must be synchronized (i.e., a full synchronization) because control will return to the translator code 19 before the successor's execution. Third, if the successor block is a member block whose register map has already been fixed, then synchronization code must be inserted to reconcile the working map with the successor's entry map.

Some of the cost of register map synchronization is reduced by the group block ordering traversal, which minimizes register synchronization or eliminates it entirely along hot paths. Member blocks are translated in the order generated by the ordering traversal. As each member block is translated, its exit register map is propagated into the entry register map 40 of all successor member blocks whose entry register maps are not yet fixed. In effect, the hottest path in the group block is translated first, and most if not all member block boundaries along that path require no synchronization because the corresponding register maps are all consistent.

For example, the boundary between the first and second member blocks will always require no synchronization, because the second member block will always have its entry register map 40 fixed to be the same as the exit register map 41 of the first member block. Some synchronization between member blocks may be unavoidable because group blocks can contain internal control branches and multiple entry points. This means that execution may reach the same member block from different predecessors, with different working register maps at different times. These cases require that the translator 19 synchronize the working register map with the appropriate member block's entry register map.

If required, register map synchronization occurs on member block boundaries. The translator 19 inserts code at the end of a member block to synchronize the working register map with the successor's entry register map 40. In register map synchronization, each abstract register falls under one of ten synchronization conditions. Table 1 illustrates the ten register synchronization cases as a function of the translator's working register map and the successor's entry register map 40. Table 2 describes the register synchronization algorithm, by enumerating the ten formal synchronization cases with text descriptions of the cases and pseudo-code descriptions of the corresponding synchronization actions (the pseudo-code is explained below). Thus, at every member block boundary, every abstract register is synchronized using the 10-case algorithm. This detailed articulation of synchronization conditions and actions allows the translator 19 to generate efficient synchronization code, which minimizes the synchronization cost for each abstract register.

The following describes the synchronization action functions listed in Table 2. "Spill(E(a))" saves abstract register a from target register E(a) into the subject register bank (a component of the global register store). "Fill(t,a)" loads abstract register a from the subject register bank into target register t. "Reallocate()" moves and reallocates (i.e., changes the mapping of) an abstract register to a new target register if available, or spills the abstract register if a target register is not available. "FreeNoSpill(t)" marks a target register as free without spilling the associated abstract subject register. The FreeNoSpill() function is necessary to avoid superfluous spilling across multiple applications of the algorithm at the same synchronization point. Note that for cases with a "Nil" synchronization action, no synchronization code is necessary for the corresponding abstract registers.

TABLE 1

Enumeration of the 10 Register Synchronization Scenarios

|  |  | $a \in dom\ W$ |  | $a \notin dom\ W$ |
|---|---|---|---|---|
|  |  | $W(a) \notin rng\ E$ | $W(a) \in rng\ E$ |  |
| $a \in dom\ E$ | $E(a) \notin rng\ W$ | 6 | 8 | 4 |
|  | $E(a) \in$ | 7 | $W(a) \neq E(a)$  9 | 5 |

TABLE 1-continued

Enumeration of the 10 Register Synchronization Scenarios

|  | $a \in dom\ W$ | $a \notin dom\ W$ |
|---|---|---|
| rng W |  | $W(a) = E(a)$  10 |
| $a \notin$ | 2 | 3  1 | dom E

LEGEND TO TABLES 1 & 2

| a | abstract subject register |
|---|---|
| t | target register |
| W | working register map $\{W(a) => t\}$ |
| E | entry register map $\{E(a) => t\}$ |
| dom | domain |
| rng | range |
| $\in$ | is a member of |
| $\notin$ | is not a member of |
| $W(a) \notin$ rng E | The working register for abstract register "a" is not in the range of the entry register map. I.e., the target register that is currently mapped to abstract register "a" ("W(a)") is not defined in the entry register map E. |

TABLE 2

Register Map Synchronization Scenarios

| Case | | Description | Action |
|---|---|---|---|
| $a \notin (dom\ E \cap dom\ W)$ | | $W(\ldots)$<br>$E(\ldots)$<br>The abstract register is neither in the working rmap or the entry rmap. | Nil |
| $a \in dom\ W$  $\hat{a} \notin dom\ E$  $\hat{W}(a) \notin rng\ E$ | | $W(a => t1, \ldots)$<br>$E(\ldots)$<br>The abstract register is in the working rmap, but not in the entry rmap. Furthermore the target register used in the working rmap is not in the range of the entry rmap. | Spill(W(a)) |
| $a \in dom\ W$  $\hat{a} \notin dom\ E$  $\hat{W}(a) \in rng\ E$ | | $W(a1 => t1, \ldots)$<br>$E(ax => t1, \ldots)$<br>The abstract register is in the working, but not in the entry rmap. However the target register used in the working rmap is in the range of the entry rmap. | Spill(W(a)) |
| $a \notin dom\ W$  $\hat{a} \in dom\ E$  $\hat{E}(a) \notin rng\ W$ | | $W(\ldots)$<br>$E(a1 => t1, \ldots)$<br>The abstract register is in the entry rmap but not in the working rmap. Furthermore the target register used in the entry rmap is not in the range of the working rmap. | Fill(E(a), a) |
| $a \notin dom\ W$  $\hat{a} \in dom\ E$  $\hat{E}(a) \in rng\ W$ | | $W(ax => t1, \ldots)$<br>$E(a1 => t1, \ldots)$<br>The abstract register is in the entry rmap but not in the working rmap. However the target register used in the entry rmap is in the range of the working rmap. | Reallocate (E(a))<br>Fill(E(a), a) |
| $a \in (dom\ W \cup dom\ E)$  $\hat{W}(a) \notin rng\ E$  $\hat{E}(a) \notin rng\ W$ | | $W(a1 => t1, \ldots)$<br>$E(a1 => t2, \ldots)$<br>The abstract register is in the working rmap and the entry rmap. However both use different target registers. Furthermore the target register used in the working rmap is not in the range of the entry rmap and the target register used in the entry rmap is not in the range of the working rmap. | Copy<br>$W(a) => E(a)$<br>FreeNoSpill(W(a)) |
| $a \in (dom\ W \cap dom\ E)$  $\hat{W}(a) \notin rng\ E$  $\hat{E}(a) \in rng\ W$ | | $W(a1 => t1, ax => t2 \ldots)$<br>$E(a1 => t2, \ldots)$<br>The abstract register in the working rmap is in the entry rmap. However both use different target registers. The target register | Spill(E(a))<br>Copy<br>$W(a) => E(a)$<br>FreeNoSpill(W(a)) |

TABLE 2-continued

Register Map Synchronization Scenarios

| Case | Description | Action |
|---|---|---|
| a ∈ (dom W ∩ dom E) Ŵ(a) ∈ rng E Ê(a) ∉ rng W | used in the working rmap is not in the range of the entry rmap, however the target register used in the entry rmap is in the range of the working rmap. W(a1 => t1, ...) E(a1 => t2, ax => t1, ...) The abstract register in the working rmap is in the entry rmap. However both use different target registers. The target register used in the entry rmap is not in the range of the working rmap, however the target register used in the working rmap is in the range of the entry rmap. | Copy W(a) => E(a) FreeNoSpill(W(a)) |
| a ∈ (dom W ∩ dom E) Ŵ(a) ∈ rng E Ê(a) ∈ rng W Ŵ(a) ≠ E(a) | W(a1 => t1, ax => t2, ...) E(a1 => t2, ay => t1, ...) The abstract register in the working rmap is in the entry rmap. Both use different target registers. However, the target register used in the entry rmap is in the range of the working rmap, and the target register used in the working rmap is in the range of the entry rmap. | Spill(E(a)) Copy W(a) => E(a) FreeNoSpill(W(a)) |
| 0  a ∈ (dom W ∩ dom E) Ŵ(a) ∈ rng E Ê(a) ∈ rng W Ŵ(a) = E(a) | W(a1 => t1, ...) E(a1 => t1, ...) The abstract register in the working rmap is in the entry rmap. Furthermore they both map to the same target register. | Nil |

The translator 19 performs two levels of register allocation within a group block, global and local (or temporary). Global register allocation is the definition of particular register mappings, before code generation, which persist across an entire group block (i.e., throughout all member blocks). Local register allocation consists of the register mappings created in the process of code generation. Global register allocation defines particular register allocation constraints which parameterize the code generation of member blocks, by constraining local register allocation.

Abstract registers that are globally allocated do not require synchronization on member block boundaries, because they are guaranteed to be allocated to the same respective target registers in every member block. This approach has the advantage that synchronization code (which compensates for differences in register mappings between blocks) is never required for globally allocated abstract registers on member block boundaries. The disadvantage of group block register mapping is that it hinders local register allocation because the globally allocated target registers are not immediately available for new mappings. To compensate, the number of global register mappings may be limited for a particular group block.

The number and selection of actual global register allocations is defined by a global register allocation policy. The global register allocation policy is configurable based on subject architecture, target architecture, and applications translated. The optimal number of globally allocated registers is derived empirically, and is a function of the number of target registers, the number of subject registers, the type of application being translated, and application usage patterns. The number is generally a fraction of the total number of target registers minus some small number to ensure that enough target registers remain for temporary values.

In cases where there are many subject registers but few target registers, such as the MIPS-X86 and PowerPC-X86 translators, the number of globally allocated registers is zero. This is because the X86 architecture has so few target registers that using any fixed register allocation has been observed to produce worse target code than none at all.

In cases where there are many subject registers and many target registers, such as the X86-MIPS translator, the number of globally allocated registers (n) is three quarters the number of target registers (T). Hence:

X86-MIPS: $n = \frac{3}{4} * T$

Even though the X86 architecture has few general purpose registers, it is treated as having many subject registers because many abstract registers are necessary to emulate the complex X86 processor state (including, e.g., condition code flags).

In cases where the number of subject registers and target registers is approximately the same, such as the MIPS-MIPS accelerator, most target registers are globally allocated with only a few reserved for temporary values. Hence:

MIPS-MIPS: $n = T - 3$

In cases where the total number of subject registers in use across the entire group block (s) is less than or equal to the number of target registers (T), all subject registers are globally mapped. This means that the entire register map is constant across all member blocks. In the special case where (s=T), meaning that the number of target registers and active subject registers is equal, this means that there are no target registers left for temporary calculations; in this case, temporary values are locally allocated to target registers that are globally allocated to subject registers that have no further uses within the same expression tree (such information is obtained through liveness analysis).

At the end of group block creation, code generation is performed for each member block, in the traversal order. During code generation, each member block's IR forest is (re)generated and the list of dead subject registers (contained in that block's liveness information) is used to the prune the IR forest prior to generating target code. As each member block is translated, its exit register map is propagated to the entry register maps 40 of all successor member blocks (except those which have already been fixed). Because blocks are translated in traversal order, this has the effect of minimizing register map synchronization along hot paths, as well as making hot path translations contiguous in the target memory space. As with basic block translations, group member block translations are specialized on a set of entry conditions, namely the current working conditions when the group block was created.

Figure 7:
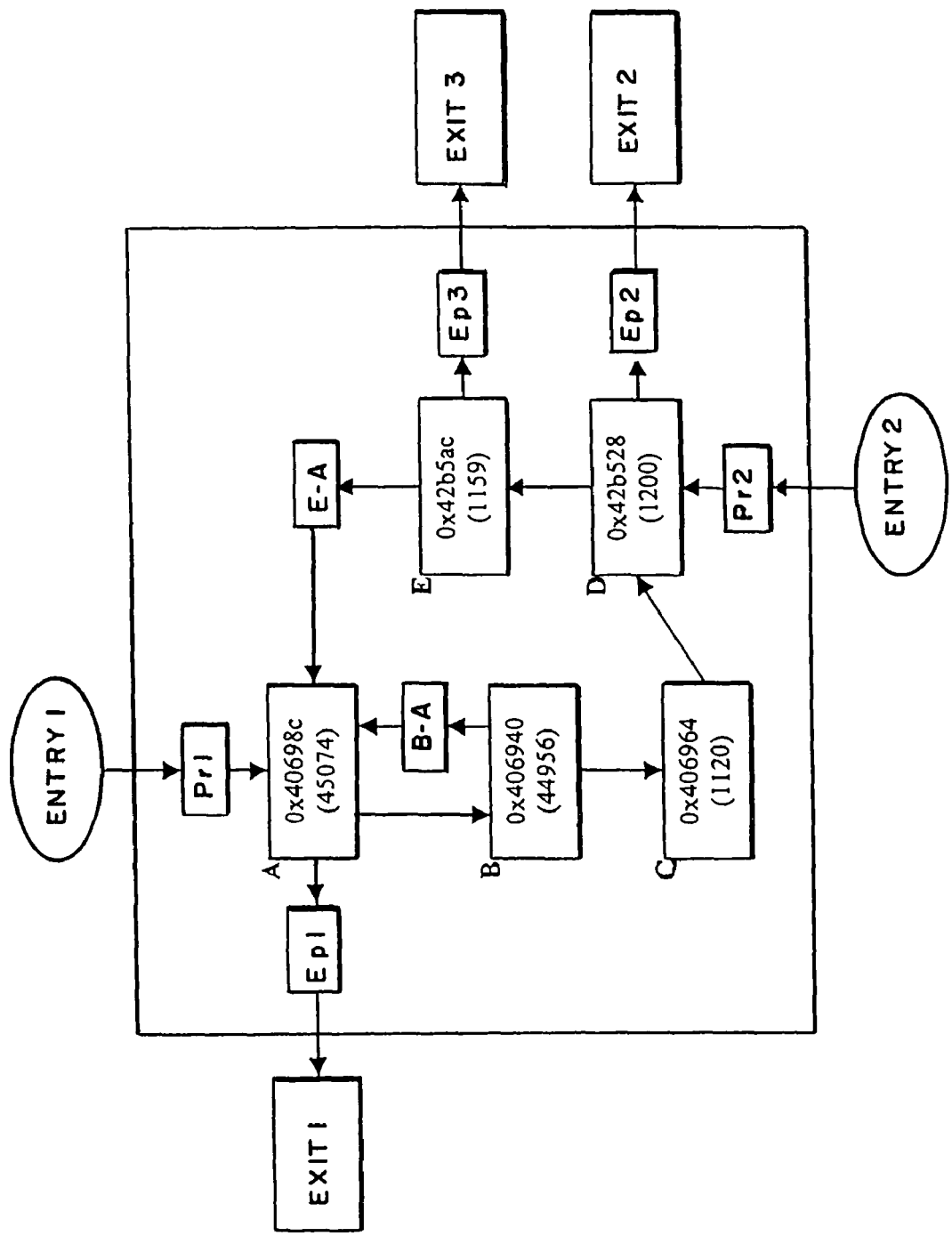
FIG. 7 is a schematic diagram of an example illustrating group block optimization.

FIG. 7 provides an example of group block generation by the translator code 19 according to an illustrative embodiment. The example group block has five members ("A" to "E"), and initially one entry point ("Entry 1"; Entry 2 is generated later through aggregation, as discussed below) and three exit points("Exit 1," "Exit 2," and "Exit 3"). In this example, the trigger threshold for group block creation is an execution count of 45000, and the inclusion threshold for member blocks is an execution count of 1000. The construction of this group block was triggered when block A's execution count (now 45074) reached the trigger threshold of 45000, at which point a search of the control flow graph was performed in order to identify the group block members. In this example, five blocks were found that exceeded the inclusion threshold of 1000. Once the member blocks are identified, an ordered depth first search (ordered by profiling metric) is performed such that hotter blocks and their successors are processed first; this produces a set of blocks with a critical path ordering.

At this stage global dead code elimination is performed. Each member block is analyzed for register uses and definitions (i.e., liveness analysis). This makes code generation more efficient in two ways. First, local register allocation can take into account which subject registers are live in the group block (i.e., which subject registers will be used in the current or successor member blocks), which helps to minimize the cost of spills; dead registers are spilled first, because they do not need to be restored. In addition, if liveness analysis shows that a particular subject register is defined, used, and then redefined (overwritten), the value can be thrown away any time after the last use (i.e., its target register can be freed). If liveness analysis shows that a particular subject register value is defined and then redefined without any intervening uses (unlikely, as this would mean that the subject compiler generated dead code), then the corresponding IR tree for that value can be thrown away, such that no target code is ever generated for it.

Global register allocation is next. The translator 19 assigns frequently accessed subject registers a fixed target register mapping which is constant across all member blocks. Globally allocated registers are non-spillable, meaning that those target registers are unavailable to local register allocation. A percentage of target registers must be kept for temporary subject register mappings when there are more subject registers than target registers. In special cases where the entire set of subject registers within the group block can fit into target registers, spills and fills are completely avoided. As illustrated in FIG. 7, the translator plants code ("Pr1") to load these registers from the global register store 27 prior to entering the head of the group block ("A"); such code is referred to as prologue loads.

The group block is now ready for target code generation. During code generation, the translator 19 uses a working register map (the mapping between abstract registers and target registers) to keep track of register allocation. The value of the working register map at the beginning of each member block is recorded in that block's associated entry register map 40.

First the prologue block Pr1 is generated which loads the globally allocated abstract registers. At this point the working register map at the end of Pr1 is copied to the entry register map 40 of block A.

Block A is then translated, planting target code directly following the target code for Pr1. Control flow code is planted to handle the exit condition for Exit 1, which consists of a dummy branch (to be patched later) to epilogue block Ep1 (to be planted later). At the end of block A, the working register map is copied to the entry register map 40 of block B. This fixing of B's entry register map 40 has two consequences: first, no synchronization is necessary on the path from A to B; second, entry to B from any other block (i.e., a member block of this group block or a member block of another group block using aggregation) requires synchronization of that block's exit register map with B's entry register map.

Block B is next on the critical path. Its target code is planted directly following block A, and code to handle the two successors, C and A, is then planted. The first successor, block C, has not yet had its entry register map 40 fixed, so the working register map is simply copied into C's entry register map. The second successor, block A, however, has previously had its entry register map 40 fixed and therefore the working register map at the end of block B and the entry register map 40 of block A may differ. Any difference in the register maps requires some synchronization ("B-A") along the path from block B to block A in order to bring the working register map into line with the entry register map 40. This synchronization takes the form of register spills, fills, and swaps and is detailed in the ten register map synchronization scenarios above.

Block C is now translated and target code is planted directly following block C. Blocks D and E are likewise translated and planted contiguously. The path from E to A again requires register map synchronization, from E's exit register map (i.e., the working register map at the end of E's translation) to A's entry register map 40, which is planted in block "E-A."

Prior to exiting the group block and returning control to the translator 19, the globally allocated registers must be synchronized to the global register store; this code is referred to as epilogue saves. After the member blocks have been translated, code generation plants epilogue blocks for all exit points (Ep1, Ep2, and Ep3), and fixes the branch targets throughout the member blocks.

In embodiments that use both isoblocks and group blocks, the control flow graph traversal is made in terms of unique subject blocks (i.e., a particular basic block in the subject code) rather than isoblocks of that block. As such, isoblocks are transparent to group block creation. No special distinction is made with respect to subject blocks that have one translation or multiple translations.

In the illustrative embodiment, both the group block and isoblock optimizations may be advantageously employed. However, the fact that the isoblock mechanism may create different basic block translations for the same subject code sequence complicates the process of deciding which blocks to include in the group block, since the blocks to be included may not exist until the group block is formed. The information collected using the unspecialized blocks that existed prior to the optimization must be adapted before being used in the selection and layout process.

The illustrative embodiment further employs a technique for accommodating features of nested loops in group block generation. Group blocks are originally created with only one entry point, namely the start of the trigger block. Nested loops in a program cause the inner loop to become hot first, creating a group block representing the inner loop. Later, the outer loop becomes hot, creating a new group block that includes all the blocks of the inner loop as well as the outer loop. If the group block generation algorithm does not take account of the work done for the inner loop, but instead re-does all of that work, then programs that contain deeply nested loops will progressively generate larger and larger group blocks, requiring more storage and more work on each group block generation. In addition, the older (inner) group blocks may become unreachable and therefore provide little or no benefit.

According to the illustrative embodiment, group block aggregation is used to enable a previously built group block to be combined with additional optimized blocks. During the phase in which blocks are selected for inclusion in a new group block, those candidates which are already included in a previous group block are identified. Rather than planting target code for these blocks, aggregation is performed, whereby the translator 19 creates a link to the appropriate location in the existing group block. Because these links may jump to the middle of the existing group block, the working register map corresponding to that location must be enforced; accordingly, the code planted for the link includes register map synchronization code as required.

The entry register map 40 stored in the basic block data structure 30 supports group block aggregation. Aggregation allows other translated code to jump into the middle of a group block, using the beginning of the member block as an entry point. Such entry points require that the current working register map be synchronized to the member block's entry register map 40, which the translator 19 implements by planting synchronization code (i.e., spills and fills) between the exit point of the predecessor and the entry point of the member block.

In one embodiment, some member blocks' register maps are selectively deleted to conserve resources. Initially, the entry register maps of all member blocks in a group are stored indefinitely, to facilitate entry into the group block (from an aggregate group block) at the beginning of any member block. As group blocks become large, some register maps may be deleted to conserve memory. If this happens, aggregation effectively divides the group block into regions, some of which (i.e., member blocks whose register maps have been deleted) are inaccessible to aggregate entry. Different policies are used to determine which register maps to store. One policy is to store all register maps of all member blocks (i.e., never delete). An alternative policy is to store register maps only for the hottest member blocks. An alternative policy is to store register maps only for member blocks that are the destinations of backward branches (i.e., the start of a loop).

In another embodiment, the data associated with each group member block includes a recorded register map for every subject instruction location. This allows other translated code to jump into the middle of a group block at any point, not just the beginning of a member block, as, in some cases, a group member block may contain undetected entry points when the group block is formed. This technique consumes large amounts of memory, and is therefore only appropriate when memory conservation is not a concern.

Group blocking provides a mechanism for identifying frequently executed blocks or sets of blocks and performing additional optimizations on them. Because more computationally expensive optimizations are applied to group blocks, their formation is preferably confined to basic blocks which are known to execute frequently. In the case of group blocks, the extra computation is justified by frequent execution; contiguous blocks which are executed frequently are referred to as a "hot path."

Embodiments may be configured wherein multiple levels of frequency and optimization are used, such that the translator 19 detects multiple tiers of frequently executed basic blocks, and increasingly complex optimizations are applied. Alternately, and as described above only two levels of optimization are used: basic optimizations are applied to all basic blocks, and a single set of further optimizations are applied to group blocks using the group block creation mechanism described above.

Block Translation Overview

Figure 8:
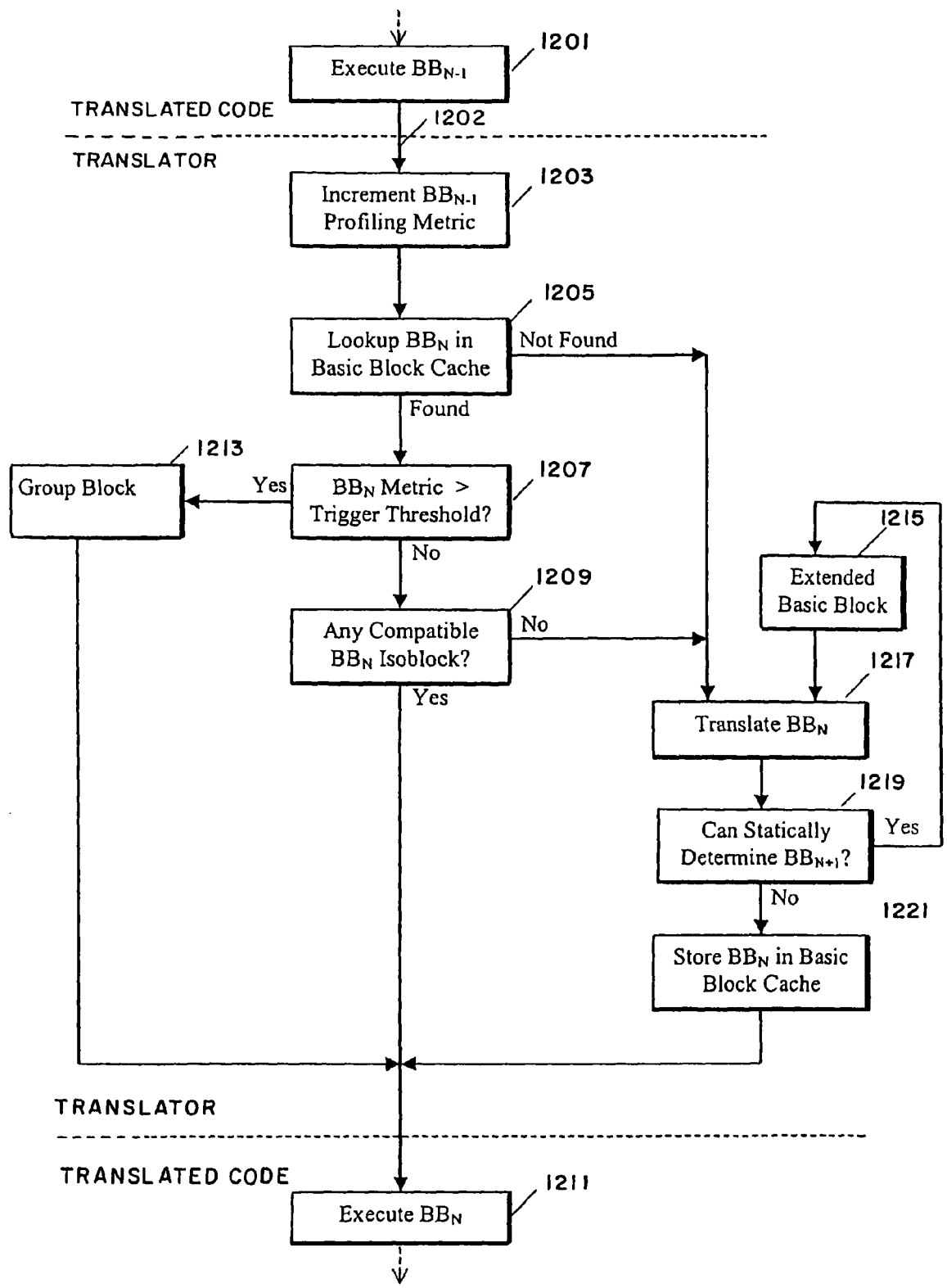
FIG. 8 is a flow diagram illustrating run-time translation, including extended basic blocking, isoblocking, and group blocking.
Figure 9:
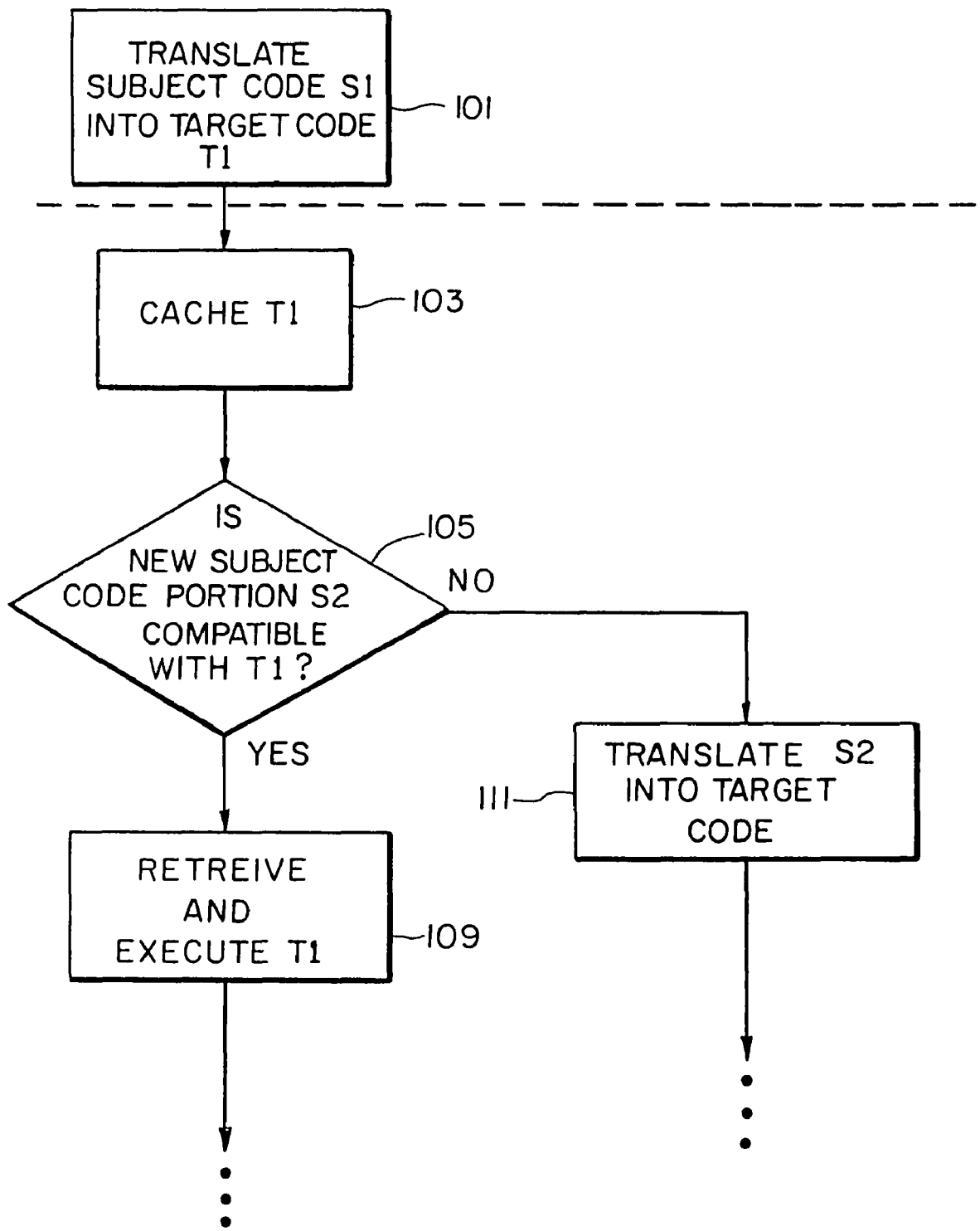
FIG. 9 is a flow diagram illustrating salient aspects of a shared code caching process.

FIG. 8 illustrates the steps performed by the translator at run-time, between executions of translated code. When a first basic block ($BB_{N-1}$) finishes execution 1201, it returns control to the translator 1202. The translator increments the profiling metric of the first basic block 1203. The translator then queries the basic block cache 1205 for previously translated isoblocks of the current basic block ($BB_N$, which is $BB_{N-1}$'s successor), using the subject address returned by the first basic block's execution. If the successor block has already been translated, the basic block cache will return one or more basic block data structures. The translator then compares the successor's profiling metric to the group block trigger threshold 1207 (this may involve aggregating the profiling metrics of multiple isoblocks). If the threshold is not met, the translator then checks if any isoblocks returned by the basic block cache are compatible with the working conditions (i.e., isoblocks with entry conditions identical to the exit conditions of $BB_{N-1}$ at step 1209). If a compatible isoblock is found, that translation is executed 1211.

If the successor profiling metric exceeds the group block trigger threshold, then a new group block is created 1213 and executed 1211, as discussed above, even if a compatible isoblock exists.

If the basic block does not return any isoblocks, or none of the isoblocks returned are compatible, then the current block is translated 1217 into an isoblock specialized on the current working conditions, as discussed above. At the end of decoding $BB_N$, if the successor of $BB_N$ ($BB_{N+1}$) is statically determinable 1219, then an extended basic is created 1215. If an extended basic block is created, then $BB_{N+1}$ is translated 1217, and so forth. When translation is complete, the new isoblock is stored in the basic block cache 1221 and then executed 1211.

Shared Code Caching

In another preferred embodiment, the translator 19 may include a shared code cache mechanism, which, for example, may allow the target code 21 and translation structures corresponding to a particular subject program to be shared between different executions or instances of the translator 19. A translator "instance" is a particular execution of the translator, meaning one translated execution of one subject program. As discussed in further detail below, such a shared code caching may be facilitated by a dedicated code cache server, which interacts with translators 19 at the beginning and end of their executions, and during execution whenever the subject code is modified (such as when a subject library is loaded).

FIG. 9 illustrates salient aspects of a shared code caching process according to an illustrative embodiment. In a first step 101, the translator 19 translates a portion of subject code $S_1$ into target code $T_1$. In order to provide for reuse of the target code $T_1$, the translator 19 caches that target code $T_1$, step 103. At decision diamond 105, the translator 19 determines compatibility between the next portion of subject code $S_2$ and the target code $T_1$ previously cached in step 103. As illustrated in connection with decision diamond 105, if compatibility exists between the cached target code $T_1$ and the new portion of subject code $S_2$, the cache target code $T_1$ is retrieved and executed, step 109, thereby eliminating the burden and necessity of translating the new subject code portion $S_1$ If compatibility does not exist, the next (new) portion of subject code is translated into target code and further processed as illustrated in step 111.

In illustrative and advantageous applications of the process of FIG. 9, the translator 19 holds all the target code produced during execution of a first subject program in temporary storage and then caches all of that target code at the end of such execution. The translator 19 then performs compatibility determinations during translation of the subject code of a second subject program.

The determination of compatibility between a new portion of subject code and cached target code illustrated in step 105 may be performed according to a number of different methods. In an illustrative embodiment, the translator uses a cache key data structure to determine if a particular cache unit is compatible with the current subject code sequence in terms of whether the current subject code sequence is the same as the previously translated subject code sequence. The translator 19 checks to ascertain whether a new subject code sequence can use a previously cached target code by comparing the cache key data structure of the new sequence against the cache key data structure of all previously generated and cached target code sequences. An exact match indicates that the translation (target code) is reusable.

In one embodiment which has been implemented, the cache key data structure contains: (1) a name or other identifier of the file containing the subject code sequence; (2) the location (i.e., offset and length) of the subject code sequence within the file; (3) the file's last modification time; (4) the version number of the translator that generated the cached translation structures; and (5) the address in subject memory where the subject code was loaded. In this embodiment, the translator 19 determines compatibility by comparing all of the components of the respective cache keys in turn. Any non-identical value indicates incompatibility.

In another or alternate embodiment, the cache key data structure 39 includes a complete copy of all the subject instructions that the cache unit 37 represents; in this embodiment, the translator determines compatibility of a cache unit 37 by comparing the entire subject instruction sequence of the cache unit 37 and with the subject code sequence to be translated, checking that each subject instruction is identical.

In another embodiment, the determination of cache compatibility by the translator is facilitated by the use of hash functions. In such case, the cache key data structure contains a numeric hash of the subject code sequence. The translator then applies a constant, repeatable hash function to the entire subject code sequence. The hash function generates a numeric representation of the sequence known as a hash number. In such an embodiment, the translator determines compatibility by simply performing an arithmetic comparison of the respective hash numbers for the translated and current subject code sequences.

This hash function technique may also be used to determine compatibility of a previously-used and currently-in-use version of respective translators instances, or different translator instances resident, for example, on two different processors in a more complex system. In such case, the translator's determination of translator version compatibility is facilitated by a numeric hash of the executable translator file, which hash number is stored in the cache key. In such embodiments, the translator hash number is generated by applying the hash function to the byte sequence that makes up the actual binary executable file of each version of the translator.

Figure 10:
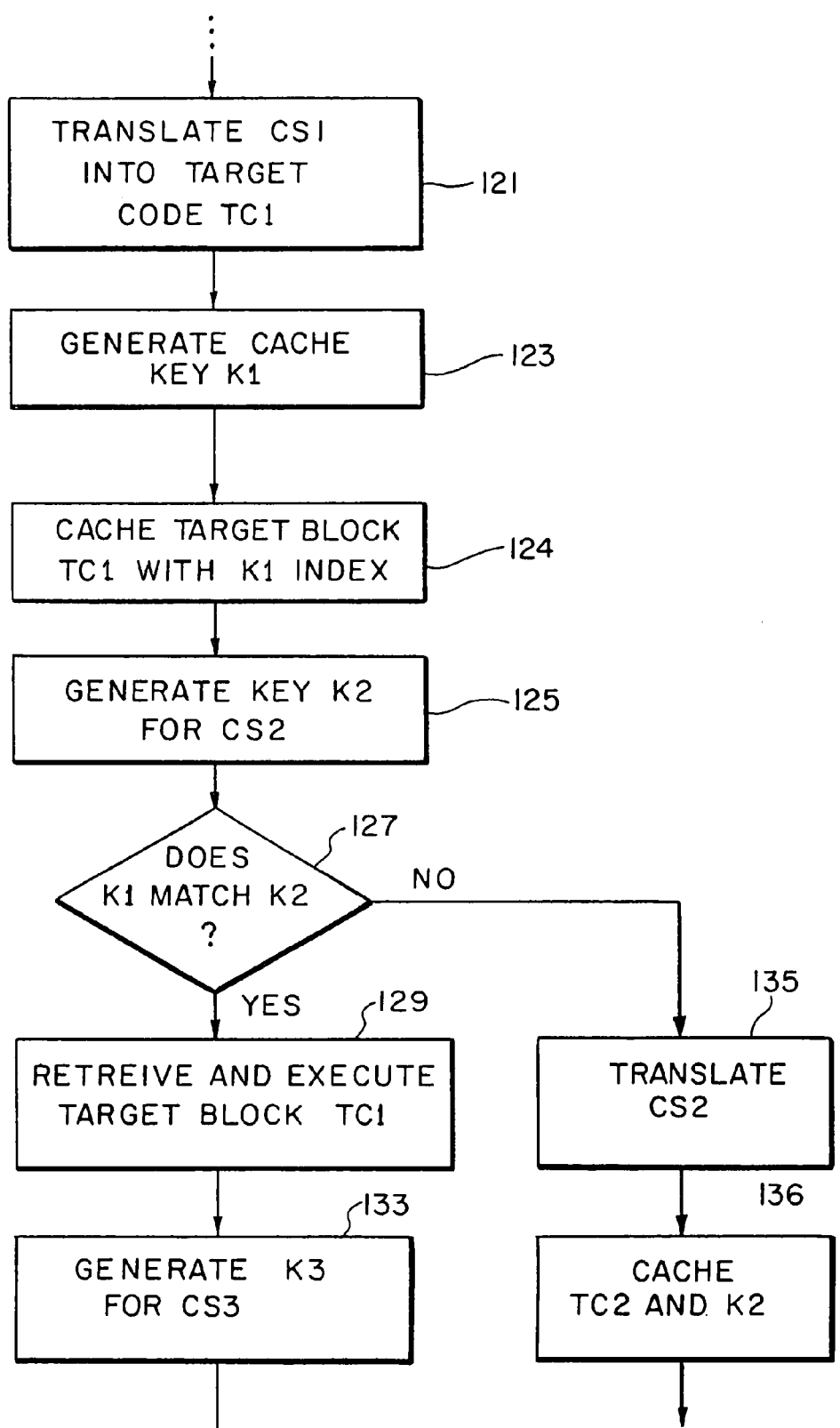
FIG. 10 is a flow diagram further illustrating a shared code caching process.

According to various embodiments, the "portion of subject code" which is translated is a code sequence, which as discussed further below may comprise a basic block or other sequences of instructions larger than a basic block. FIG. 10 illustrates a shared code caching process where in each cache unit represents a particular code sequence.

According to the process illustrated in FIG. 10, the translator 19 translates a first code sequence CS1 into target code TC1, as illustrated in step 121. The translator 19 then generates a cache key $K_1$ which indexes the target code block TB1 corresponding to code sequence CS1, as illustrated in step 123. In step 124, the translator 19 stores the target block $TC_1$ along with its associated key $K_1$ into cache storage. In step 125, the translator 19 begins processing a second code sequence CS2, first generating a cache key $K_2$ for that sequence. Then in comparison step 127, the translator 19 compares the cache key $K_2$ to those keys associated with codesequences previously stored in the cache 29, including key $K_1$. If the cache key $K_1$ matches the cache key $K_2$, then, as illustrated at step 129, the target code block $TC_1$ corresponding to the cache key $K_1$ is retrieved from the cache 29 by the translator 19 and executed. The flow then proceeds to step 133 wherein the translator 19 then begins to process code sequence CS3, first generating a cache key $K_3$ for that sequence and then examining the index of cache keys . . . $K_1$, $K_2$ . . . for a match. If $K_1$ does not match $K_2$ at step 127, the second code sequence is translated into target code $TC_2$, which is then cached, as illustrated in steps 135, 136.

In an illustrative embodiment, each cache unit contains all the translation structures necessary to represent a subject code sequence. A code sequence may be a basic block as defined heretofore, or a larger sequence of instructions for which code is generated. In case of such larger sequences, all the pertinent data associated with all the basic blocks in the code sequence is kept in the same cache unit.

In such an illustrative embodiment, the data structures stored in a cache unit comprise:

(a) BasicBlock objects—each BasicBlock object associates a subject address to some data. This data includes:
Profile information for that subject address (e.g. execution count)
Pointer to equivalent target code (if it exists)
Whether the target code pointed to is Basic Block or Group Block target code.
"Successor Information", the actual content of which depends on how the block ends:
If the code sequence ends with an unconditional jump, the successor information points to the next BasicBlock object to execute.
If the code sequence ends with a computed jump (e.g. "branch to link register") then the successor information points to a Successor Cache—which maps subject addresses to basic block addresses. Each block that ends with a computed jump has its own successor cache.
If the code sequence ends with a branch, the successor information points to the basic blocks representing the next subject address to execute, if the branch is taken/not taken.
(b) Target Code—both group block and basic block.
(c) Group Block information—maintained after group block generation to allow group blocks to grow and change over time.
(d) A Block Directory—this is a map of subject addresses to Basic Blocks. Every Basic Block in the cache unit has an entry in the Block Directory.

In the Successor Information, in cases where the next BasicBlock to execute lies outside the current cache unit, some special flag (e.g. null pointer) is used to indicate that some special action must occur. Here, the address of the next Basic Block cannot be hard-wired, since the destination block may not be available and so must be obtained by searching all the cache units available on the system to find an appropriate successor. The Partitions mechanism disclosed in co-pending patent application entitled, "Method and Apparatus for Partitioning Code in Program Code Conversion," U.S. application Ser. No. 10/802,309 filed on Mar. 17, 2004 and hereby incorporated herein by reference is one mechanism which may be used to split up cache units based on the subject address so that all BasicBlocks that represent code within a particular range of subject addresses are placed in the same cache unit (as are the corresponding Successor Caches, Target Code, Group Block Information and Block Directory). However, other alternative mechanisms may be employed.

Every data structure in the particular example of a cache unit structure under discussion can only include pointers to data that is also in the same cache unit. Therefore referencing objects between cache units requires some special work. This is because one cannot rely on the destination cache unit being available. For this reason, Group Blocks are wholly contained within a single cache unit.

Figure 11:
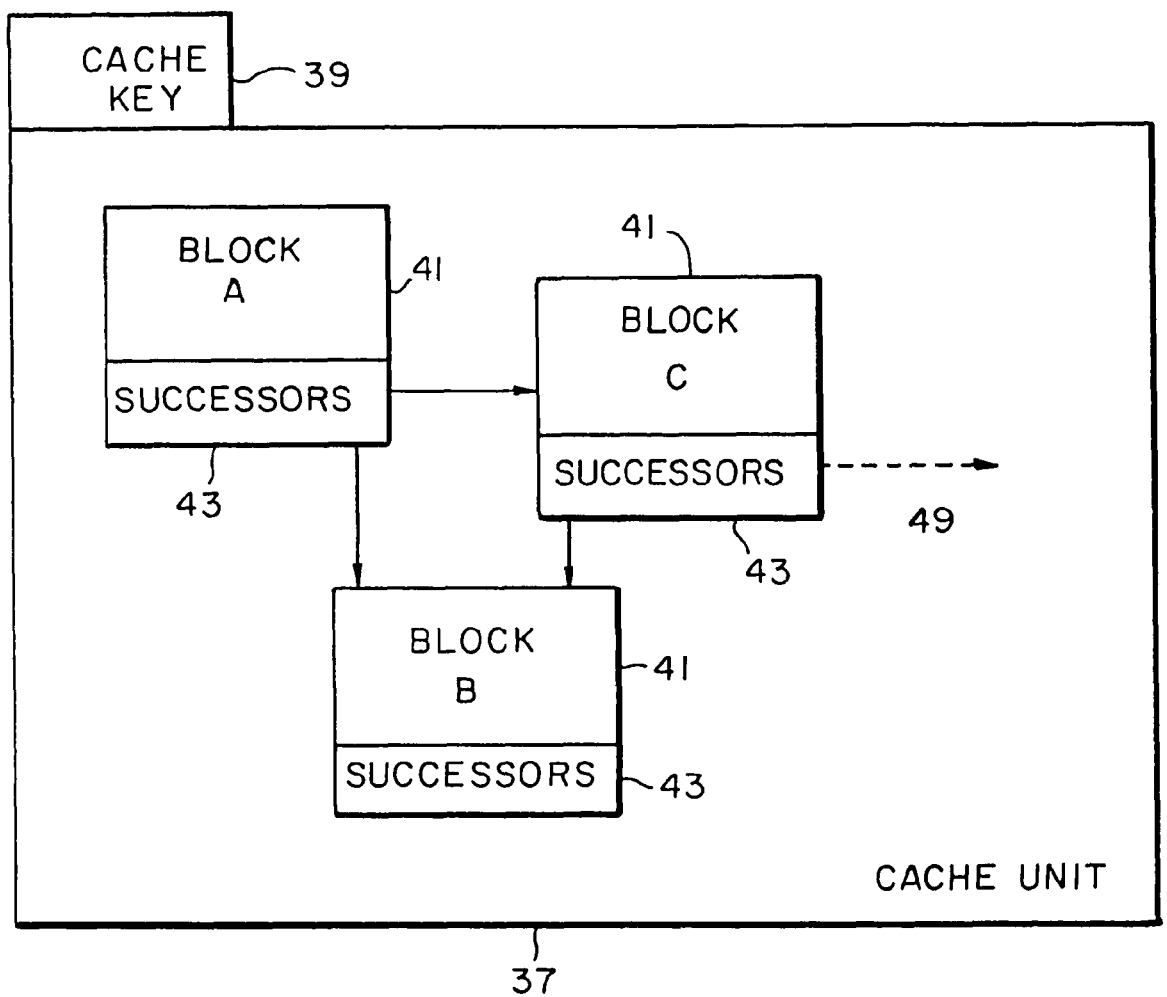
FIG. 11 is a schematic diagram illustrating an example of a cache unit.

An example of (a) cache unit 37 is illustrated in FIG. 11. The cache unit 37 of FIG. 11 particularly comprises one or more block translations 41 and the successor lists 43 associated with those blocks 41. In this way, each cache unit 37 is independent, meaning that the translation structures within the cache unit 37 do not depend on the existence of any translation structures outside that cache unit, because individual cache units may be loaded and unloaded from the cache server 35 independently. Such a cache unit 37 contains all translation structures necessary to represent a particular subject code sequence, which may exclude successor subject code sequences. In this context, a "subject code sequence" may comprise multiple subject instructions which are sequential in terms of control flow, but which may not be contiguous in terms of subject address. In other words, a cache unit 37 contains at least one translated block (i.e., a target code sequence which represents a particular subject code sequence) and all the translation structures that the translated block(s) depends on. For example, in an embodiment where a cache unit 37 contains translated blocks 41 A, 41 B and 41 C, the successor lists 43 of those blocks are necessary translation structures, but the successor blocks 49 themselves are not necessary.

In various embodiments, the translator 19 can define additional cache unit data structures of various scope. For example, when the translator 19 knows that the subject program is not self-modifying, the subject program and all of its associated libraries can be grouped into a single cache unit. The translator 19 may further establish one or more of the following types of cache units: (a) each individual subject instruction may be a separate cache unit, (b) each basic block may be separate cache unit, (c) all blocks corresponding to the same starting subject address may be grouped into a single cache unit, (d) a cache unit may represent a discrete range of subject code addresses, (e) each subject library may be a separate cache unit, (f) each subject code application is represented in a single cache unit which includes all the target code for that application (executable and all libraries). The translator 19 may further vary the level of granularity for cache units depending on the specific translation requirements and target environment.

As another advantageous example, some subject operating systems 20 in which the translator 19 finds application have a region of memory reserved for immutable libraries, wherein each immutable library is always loaded at the same subject address. This region of memory is treated as a single cache unit. For example, the MacOS operating system has a reserved memory range (0x90000000-0xA0000000) which is reserved for immutable shared libraries; translators configured to translate from the MacOS architecture represent the entire MacOS shared library region in a single cache unit. In appropriate cases in which a cache unit contains multiple subject libraries, the cache key for the cache unit contains the file modification times of all libraries loaded into that region. Modification of any of the subject libraries contained within this cache unit will render the translation structures contained therein unusable for future instances of the translator. If one of the underlying libraries is modified, subsequent translator instances must then rebuild the translation structures for that cache unit (i.e., for the MacOS shared library region). The new translation structures will have a corresponding cache key that reflects the new configuration of (i.e., the new subject code contained in) the libraries.

Shared code cache methods as described thus far can be implemented in a number of different architectural schemes. In various embodiments for implementing shared code caching, such as those shown in FIGS. 12-16, a shared code cache storage facility 29 permits the target code 21 and translation structures (cache units) corresponding to a particular subject program to be shared between different executions or instances of the translator 19. A translator "instance" is a particular execution of the translator, meaning one translated execution of one subject program.

Figure 12:
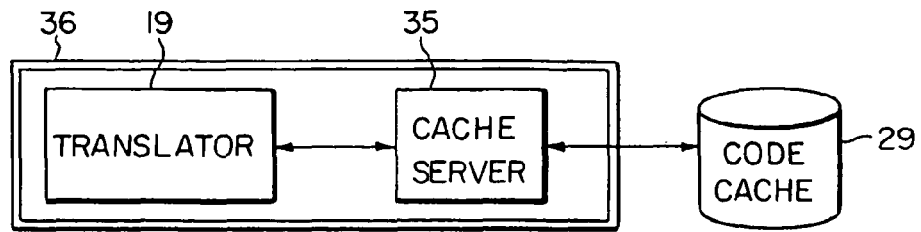
FIG. 12 is a schematic diagram illustrating a translator instance and a local code cache and server.

For example, as illustrated in FIG. 12, a shared code cache 29 is facilitated by a dedicated code cache server 35, which interacts with the translator 19 at the beginning and end of its execution, and during execution whenever the subject code is modified (such as when a subject library is loaded). In the embodiment of FIG. 12, the cache server 35 resides on the same system or target architecture 36 as the translator 19. In other embodiments, the cache server 35 may be a subsystem of the translator.

Figure 13:
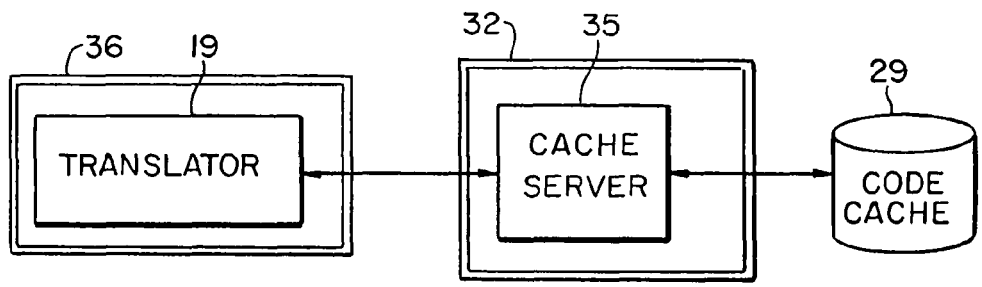
FIG. 13 is a schematic diagram illustrating a translator instance and a remote code cache and server.

FIG. 13 illustrates an embodiment wherein the cache server 35 resides on a different system 32 than the translator instance 19. In such case, the architecture of the server system 32 may be different from the target architecture 36.

Figure 14:
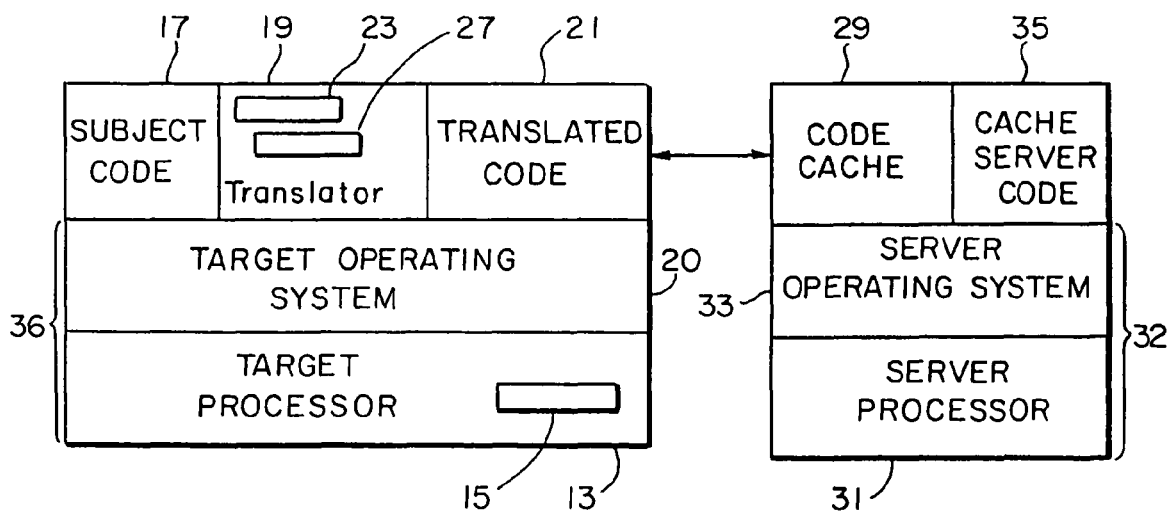
FIG. 14 is a schematic diagram illustrating a cache server running on a different system than cooperating translator code.

FIG. 14 illustrates an embodiment wherein the translation system of FIG. 1 cooperates with a cache server 35 which is running on a different system 32. In this case, the cache server 35 runs on a different processor 31 and different operating system 33, than those on which the translator 19 runs.

Figure 15:
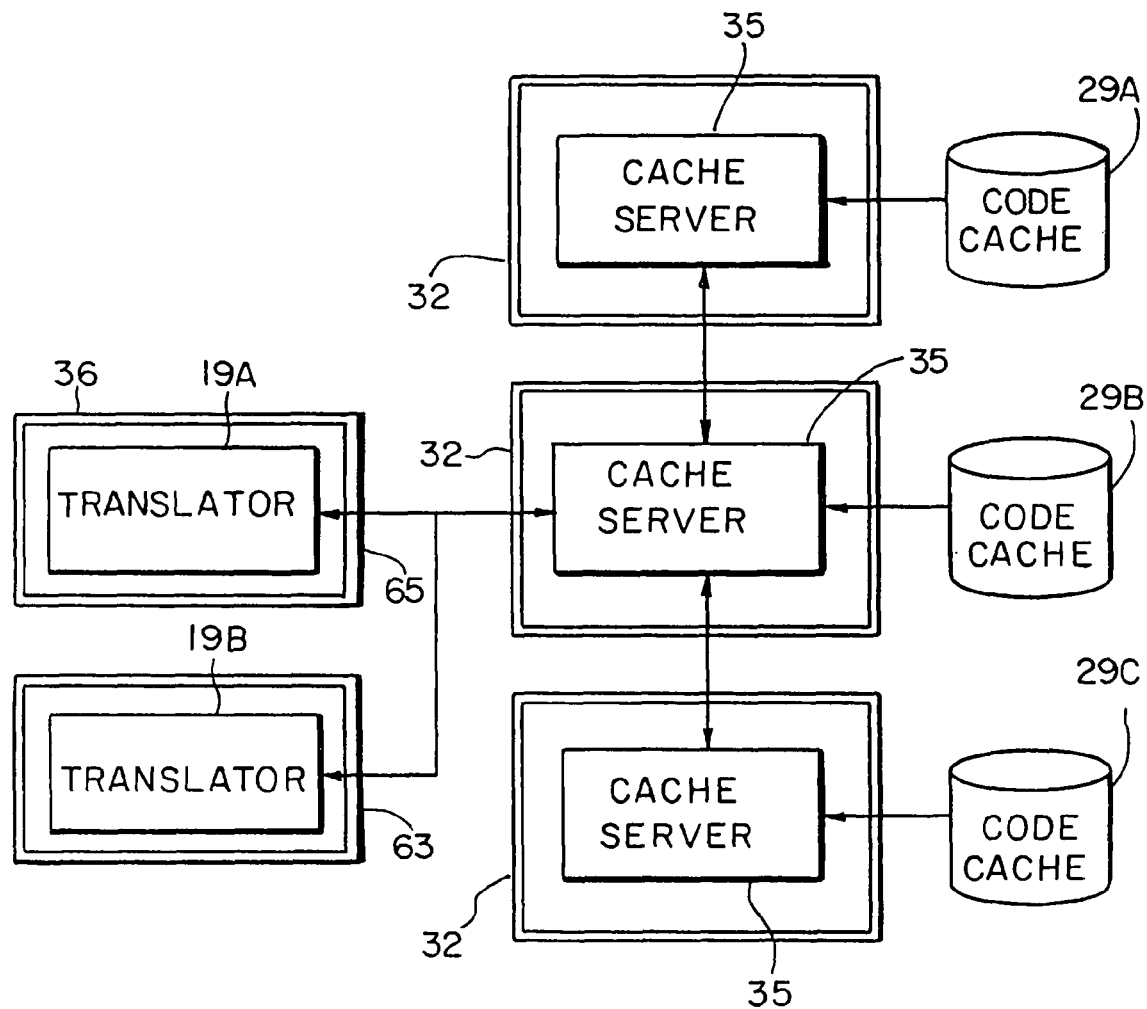
FIG. 15 is a schematic diagram of a system wherein the cache server is a network of connected processes sharing multiple caches.

In the alternative embodiment of the shared cache technique illustrated in FIG. 15, the cache server 35 is a network of connected processes which share translated code store in respective caches 29A, 29B and 29C between translator instances 19*a*, 19*b* running on different systems 63, 65 wherein the target architecture of the systems 63, 65 is the same. Systems 63, 65 could be, for example, a pair of networked desk top computers. A single cache server may serve caches to any number of different configurations of the translator 19, but a particular cache 29 may only be shared between compatible configurations of the translator 19.

In one embodiment of the shared cache technique of FIG. 14, the cache server 35 is a dedicated process which actively responds to queries from translator processes. In an alternative embodiment, the cache server 35 is a passive storage system such as a file directory or database of cache units.

Further, in an illustrative embodiment of FIG. 14, the translator 19 saves cached translation structures in a persistent store by storing cache units as files on disk when the subject program ends, and by further maintaining an index file containing all cache key structures associated with the cached subject code sequences. For example, in one such embodiment a code cache comprises a directory of files within the file system of the cache server operating system 33, wherein each cache unit 37 is stored as a single file in the cache directory structure. In another embodiment of the system of FIG. 14, persistent storage is implemented by a persistent server process which "owns" the cached translation structures, and which distributes cache units to translator instances in response to requests by the translator 19.

Thus, in implementation of illustrative share code cache methods, when translation of a subject program reaches a subject code sequence for which the translator 19 does not already have a translation, the translator 19 checks the cache server 35 for a compatible code cache. If a compatible cache is found, the translator 19 loads the cache, which includes target code 21 and translation structures. A code cache potentially contains all of the translated code 21 created over the course of a previous translated execution of the subject program, including optimized target code such as group blocks as described heretofore in connection with FIGS. 6 & 7. This allows a later translator execution to piggyback on the efforts of earlier executions; large sections of subject code may have already been translated and possibly optimized, thereby reducing startup time, reducing translation cost, and increasing performance.

Shared caching allows different instances of the translator 19, such as instances 19a, 19b of FIG. 12, to benefit from each other's efforts. In particular, shared caching allows the translation structures created in one translator instance to be reused in another translator instance. "Translation structures" in this context refers to generated target code (i.e., translations of particular subject code sequences) and other data that the translator 19 uses to represent, manage, and execute subject code. An example of such translation structures are those described in connection with FIG. 11 wherein the translation structures 37 include basic block translations and successor lists.

Shared caching allows the result of the translations to be reused when a later translator instance executes either the same subject program or a different subject program that has common subject code (e.g. system libraries). Shared caching allows translation structures that were created in a previous translator instance to be reused in cases where a later translator instance encounters the same subject code sequence. If a previous translator instance encounters a particular subject code sequence, and then a later translator instance encounters the same subject code sequence, shared caching allows the latter translator instance to use translation structures created by the previous translator instance. In other words, shared caching allows the translation of a particular subject code sequence (i.e., a cache unit) to persist beyond the lifetime of the translator instance that created the translation.

In terms of cached translations, subject code can be divided into two categories: (1) executable code loaded into memory from disk, which includes the subject binary, statically linked libraries, the linker, and any libraries loaded at run-time; (2) subject code generated on the fly for the purposes of run-time compilation, trampolines or some other form of dynamically generated subject code (i.e., self-modifying code). The shared caching technique finds particular application in connection with the first category of subject instruction sequences, referred to herein as "static" code. Static subject code is likely to contain the exact same subject instruction sequences across (a) multiple executions of the same application and (b) multiple applications (e.g., system libraries). Cache units that correspond to static subject code are referred to herein as static cache units. In contrast, within the context of the shared caching technique, programs whose subject code changes at run-time is referred to as "dynamic."

In one optimization of shared caching, at the end of a translator instance execution, the translator 19 determines which portions of the subject program consist of static subject code and limits the application of the shared caching technique to those static portions. In such embodiments, at the end of a translator instance execution, only the translation structures corresponding to static code are cached, whereas translation structures corresponding to dynamic code are discarded.

Cache Evolution

In embodiments where the cache 29 is updated at the end of a translator execution (i.e., the translated program terminates), the cache server 35 may be configured to compare that execution's current body of translations to the code cache currently stored by the server 35. In such configuration, if the current execution's code cache is "better" than the previously stored version, the server stores the cache units from the current execution for future use. The process of copying translations from a translator instance to the cache 29 (i.e., when the instance's translations are better than the server) is referred to as "publishing." As such, the quality of the code stored in the cache 29 improves over time. The process and result of this technique may be referred to as "cache evolution."

Even if a translator instance initially takes structures from the cache, the execution of that instance may cause new subject code sequences to be translated, and therefore new translation structures to be created. When such a translator instance ends, its own set of translation structures may be more complete than the corresponding set stored in the cache.

Figure 16:
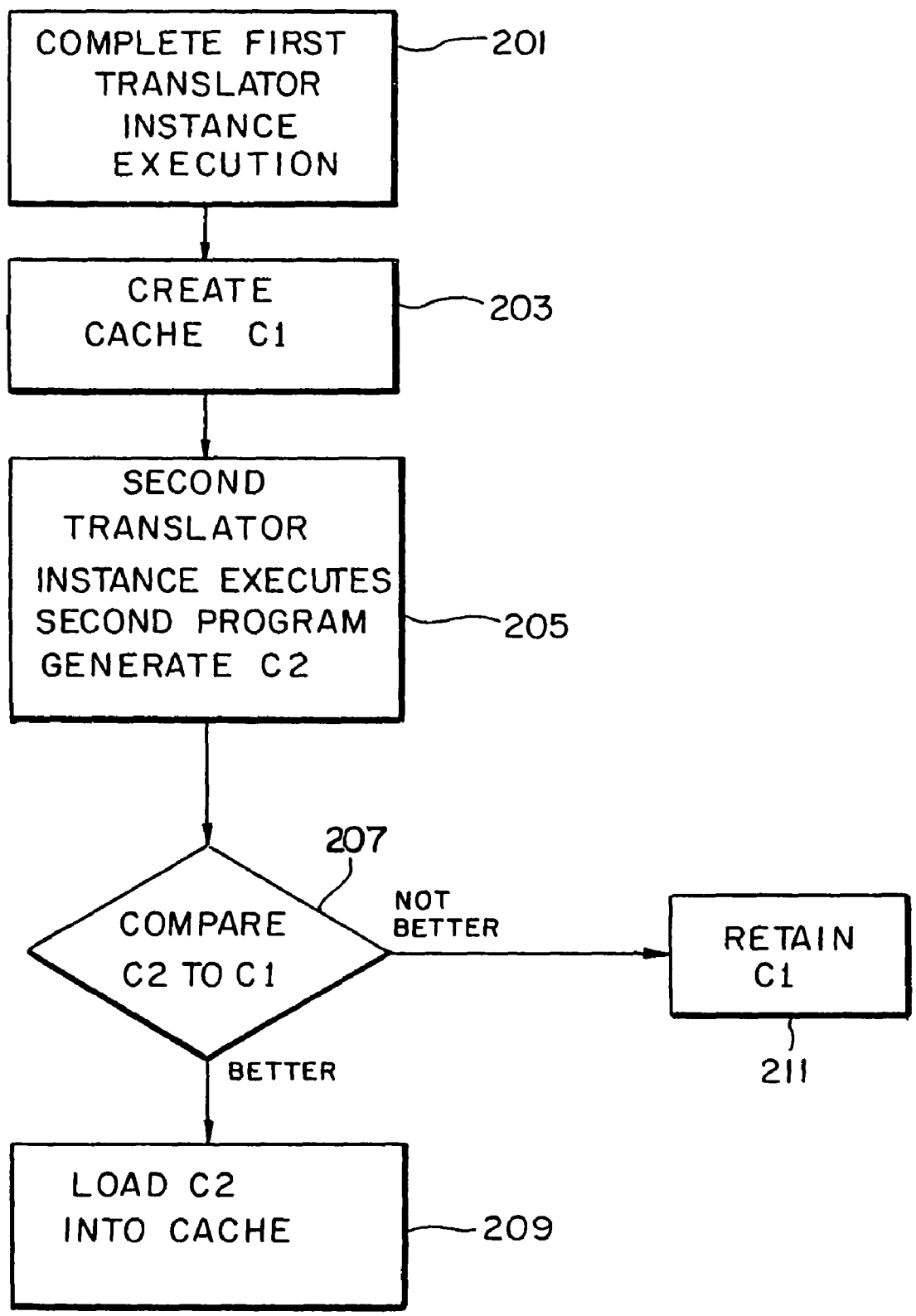
FIG. 16 is a flow diagram illustrating cache evolution.

According to the illustrative process of FIG. 16, a first translator execution, step 201, is performed and then, in step 203, its cache units $C_1$ are cached. A second instance of the translator 19 then executes a second program, and generates cash units $C_2$, step 205. The second translator instance 19 then compares its translation structures $C_2$ at the end of its execution with those translation structures $C_1$ stored in the cache 29 in step 207, and determines if the just-produced translations are "better" than the ones available in the cache 29 according to some appropriate criteria. For example, determining whether one code cache is better than another may be based on the number of subject instructions translated, the number of optimizations applied, or by execution of an algorithm which evaluates the quality of the generated code. As illustrated in step 209, if $C_2$ is better then $C_1$, then cash structures $C_2$ are loaded into the cache 29, replacing the structures $C_1$. Otherwise, the structure $C_1$ is retained at step 211.

In embodiments where the translator 19 does not use cache evolution, at the end of execution a translator instance discards all new translation structures (i.e., all those which were not initially borrowed from the cache).

In alternative embodiments, the system may be configured such that the translator instances publish their translation structures to the cache server, e.g., 35, at selected times during execution, rather than only at the end of execution. This permits making translation structures available to other translator instances prior to the termination of the translated program, for example, in systems such as FIG. 17 where multiple translator instances $T_1, T_2 \ldots T_n$ may be concurrently executed. The selected publication times or "cache synchronization points" may include: (1) during "idle" periods where the translated application is not doing much; (2) after a threshold number of translation structures have been generated (e.g., publishing every time the translator instance generates some unit of target code, such as one megabyte); and (3) when a new translator instance requests translation structures that, although not in the shared cache, are known to exist in a currently running instance of the translator.

Parallel Translation

In various embodiments of the cache server 35, the server 35 may be further configured to optimize the code cache 29 during idle periods, when the server 35 is not busy sending/receiving code caches to/from translator instances. In such embodiments, the cache server 35 performs one or more of the following optimizations to transform the code cache: (a) restructure the cache directory structure to make searches for particular cache units more efficient; (b) delete translations that have been superseded by subsequent, more optimized translations of the same subject code; (c) rearrange the code cache to locate frequently requested cache units near each other, to improve the hardware cache performance of the cache server 35 (i.e., reduce the number of hardware cache misses generated by the cache server 35 in the server system's 32 hardware cache); (d) perform expensive optimizations of cached translations (offline optimization by the cache server incurs no translation cost or performance penalty in the translator instance); (e) translate subject code which has not yet been translated by a translator instance but which a translator instance is expected to encounter (i.e., offline predictive translation).

Shared Memory

Another optimization of the shared caching technique is to use shared memory to access cached translation structures which are inherently read-only (i.e., whose contents seldom if ever change). Significant portions of translation structures stored in cache units may be read-only throughout the life of a translator instance, such as generated target code sequences: once generated, a target code sequence is rarely discarded or changed (even though it may be subsumed by subsequent, optimized translations). Other cache unit components, such as execution counts and branch destination profiling data, are expected to change frequently as they are regularly updated throughout execution of the translator. In cases where the same cache unit structures are used simultaneously by multiple translator instances, e.g. FIG. 17, the read-only components of those translators may be accessed as shared memory. This optimization can reduce the overall physical memory usage of multiple translations running on a single target system.

An illustrative shared memory application, the translator 19 loads a code cache file into a shared memory region. The cache file is preferably shared using a copy-on-write policy. Under a copy-on-write policy, the cache file is initially shared across all running translator processes, "Copy-on-write" means that when a particular translator instance modifies the cached structures in any way (e.g., incrementing a block's execution count), the modified portions of the cache at that point become exclusive to that particular execution and thus the memory region containing the modified regions can no longer be shared.

In an illustrative application, the cache 29 includes profiling data structures, which are constantly updated as the translator 19 runs, and other data structures (such as target code), which remain unchanged once they are generated. The operating system on which the translator 19 runs provides, for example, 4 kb memory pages as the unit of sharing. A large (1 MB) cache can be shared across multiple processes, and any modifications to the cache cause the page that contained the modification to become private to that process (the page is copied and only the private copy is modified). This allows the majority of the cache 29 to remain shared, while the mutable profiling data is made private to each process. The cache 29 is preferably deliberately arranged to dedicate a range of pages to mutable profiling data, rather then spreading the profiling data out across the cache 29. This reduces the amount of memory that will be rendered private by local modification.

Distributed Caching

In the embodiments described below, the shared caching technique is implemented as a cache system comprising one or more translator instances and one or more server processes that interact with each other. In addition to the embodiments described above, in other embodiments cache servers are organized into a distributed system of caches according to any of several methodologies that are well-known in the fields of hierarchical caches and distributed caches, with corresponding well-known techniques for lookup and store operations.

In cache systems which comprise two or more caches such as that illustrated in FIG. 15, various techniques may be used in the organization of the respective caches. Such techniques include scoped caches, ranged caches, and cache policies. These techniques can be used in combination.

In embodiments of the cache system which use scoped caches, each cache has a different cache scope. Scoped caches are accessible only to a particular set of translator instances. The cache scope of a particular cache defines which translator instances are able to access that cache. For example, in one embodiment each cache has either a "private" or "global" cache scope. A private cache can only be accessed by the translator instance that created it, and its contents do not persist after the translator instance exits. A global cache can be accessed by any translator instance, meaning that more than one translator can retrieve cache units from the cache, or store cache units into the cache. The contents of a global cache persist beyond the termination of particular translator instances.

Embodiments of a scoped cache system may include other possible cache scope values, including (a) application, (b) application type, (c) application vendor, or others. A cache with "application-specific" cache scope may only be accessed by translator instances that are executing the same subject application. A cache with "application" cache scope may only be accessed by translator instances that are executing the same type of applications (e.g., interactive, server, graphical). A cache with "application vendor" cache scope may only be accessed by translator instances that are executing applications made by the same vendor.

In embodiments of the cache system which use ranged caches, each cache is associated with a subject address range, such that the cache only stores cache units containing translations with starting subject addresses in that range.

Figure 17:
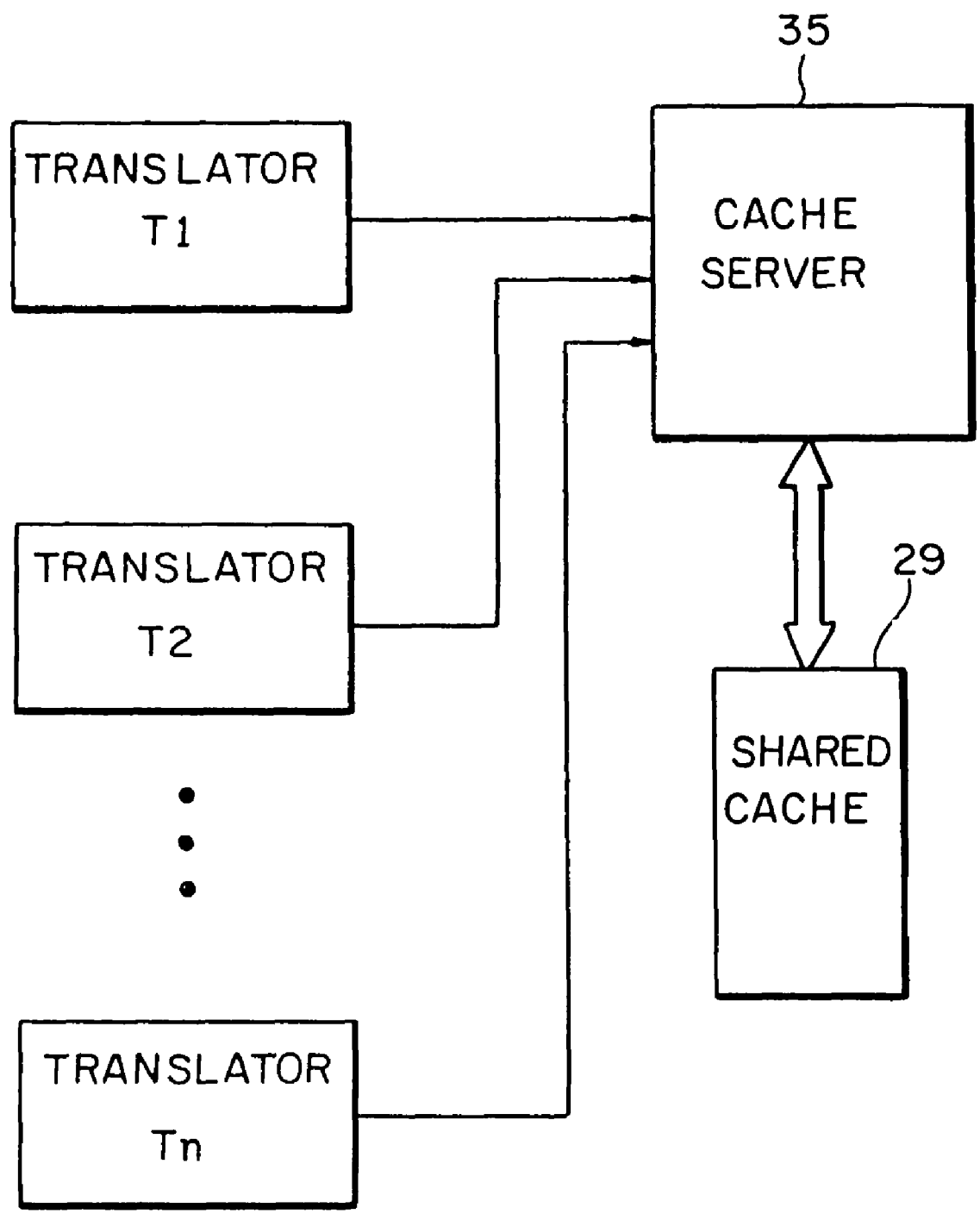
FIG. 17 is a schematic diagram illustrating a system wherein the same cache unit structures are utilized by multiple translator instances.
Figure 18:
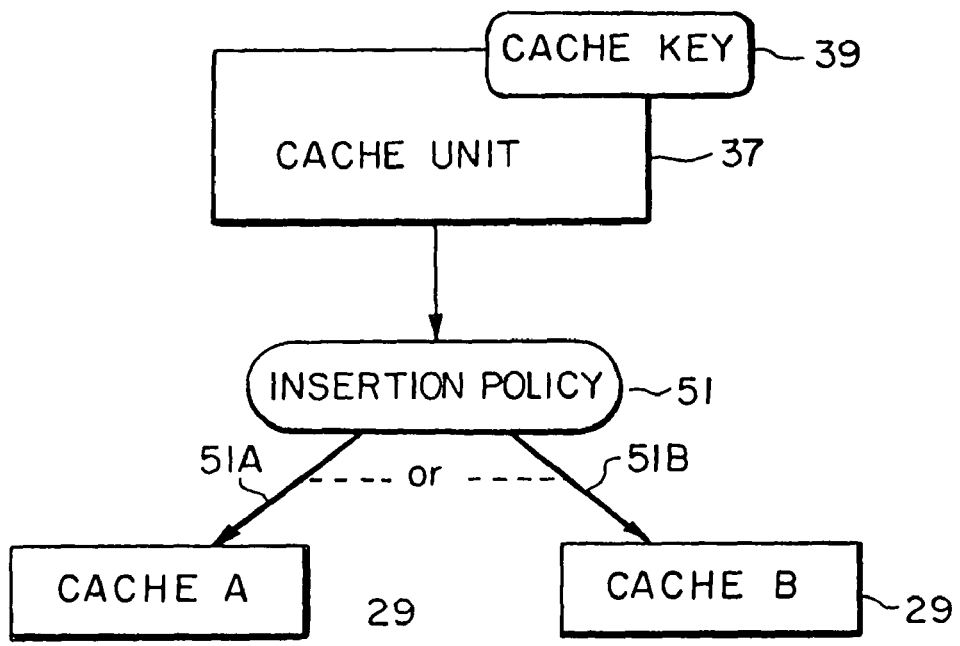
FIGS. 18 and 19 are schematic diagrams respectively illustrating implementation of cache insertion and cache look-up policies.
Figure 19:
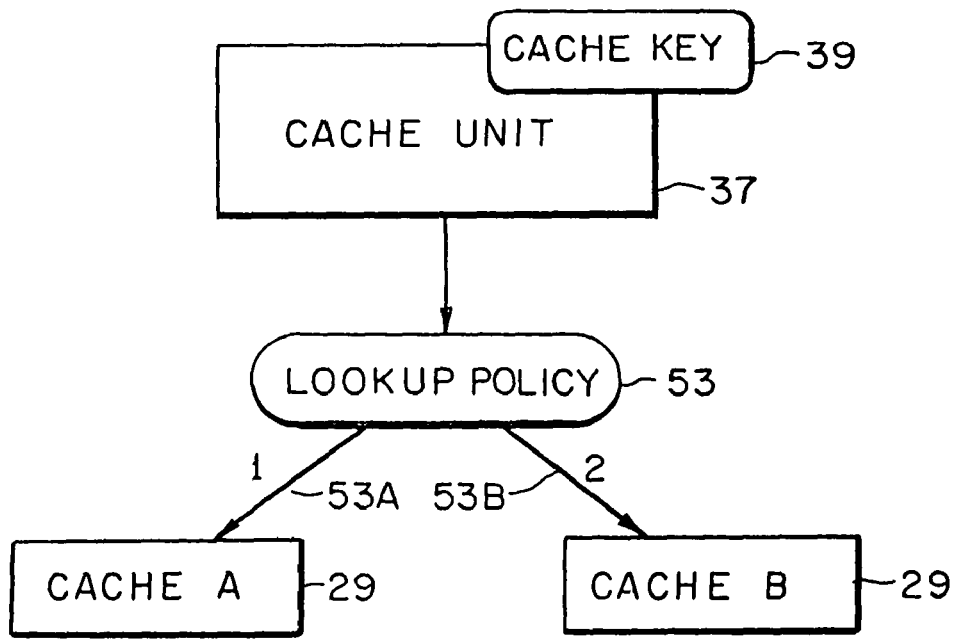

In a cache system comprising two or more caches, different cache policies may be implemented which alter the structure and constraints of how the respective caches are used. A cache policy comprises an insertion policy and a corresponding lookup policy. As illustrated in FIG. 17, when the cache system stores a cache unit 37, the insertion policy 51 defines the cache A,B into which the cache unit is stored. As illustrated in FIG. 18, when the cache system tries to retrieve a cache unit 37, the lookup policy 53 determines the order in which the multiple caches A,B are queried.

For example, Table 3 illustrates three examples of cache policies, in terms of insertion policy, lookup policy, and the effect of the cache policy on the cache system.

TABLE 3

| | Insertion Policy | Lookup Policy | Effect |
|---|---|---|---|
| | | Cache Policies | |
| 1 | Add all structures to a shared cache A until it reaches a certain size, then use a private cache B. | Largest cache first. | This policy enforces a hard limit on the size of shared caches. |
| 2 | If no global cache exists, create a shared cache A and store all translation structures to A. If a shared cache A already exists, create private cache B and store all new translation structures to B. | Largest cache first. | This effectively gives the first translator instance free rein to add all translation structures to the shared cache. This is advantageous, for example, when the cache is shared between applications that utilize the cache unit in similar ways (i.e., similar control flow), such as identical applications or applications from the same vendor. |
| 3 | For all translations which are optimized on a particular control flow (e.g., group blocks), store to a cache of narrower scope A. For all other translations, store to a cache of wider scope B. I.e., cache B has a wider scope than cache A. | Narrowest cache scope first. | This allows instances of the translator to benefit from general-purpose optimizations that were performed by other instances, while still allowing each instance to create its own optimized code. |

In cases where the lookup policy yields only a partial ordering of the caches, other heuristics may be used to create a complete ordering. In other words, the lookup policy may come up with a group of caches that all have the same priority relative to other cache groups; additional heuristics act as the intra-group tiebreaker. For example, the cache system may use the heuristics of (a) largest first, (b) most recent hit, or others. In the "largest first" heuristic, the largest cache is queried first, then the second largest cache, and so forth. In the "most recent hit" heuristic, the cache in the group which most recently returned a cache hit is queried, then the cache containing the next most recent hit, and so forth.

In a cache system with two or more caches, a query on a particular cache key may return multiple caches, each of which contains a translation structure matching the cache key. In choosing between multiple hits, the cache1 system may take other factors into account. Such factors effectively interact with cache policy to determine the structure and performance of the cache system. Such factors may include (a) the set of all possible cache scope values (i.e., how many different scope levels are there), (b) memory or disk space constraints of the translator instance or cache server, (c) the subject application being executed, or others.

Aggressive Optimization

There are several optimizations that a dynamic binary translator can perform, or which the translator can be configured to apply more aggressively or more frequently, at the expense of additional translation cost. In embodiments of the translator that do not use the shared caching technique, the translator must balance translation costs and execution costs to optimize a particular translator instance (i.e., one execution).

In embodiments of the translator that use the shared caching technique, translation costs can be measured across multiple translator instances, rather than a single translator instance. As such, aggressive optimization of translated code is more attractive in the presence of caching. While the initial translation cost is higher in an aggressive optimization scheme, the existence of multiple subsequent translation instances justifies the expense, as each subsequent translation enjoys the benefits of early optimization efforts. The cost of aggressive translation becomes a "one-time" hit incurred by the first translator instance (of a particular subject code sequence or subject program), but the benefits of the optimized translation are then enjoyed by all future instances of the translator that are able to use the cache.

Therefore, in translators utilizing the shared caching technique, there is a case for applying more expensive optimizations during the first execution of a particular subject program. This may result in slightly lower performance for the first execution, but the resulting translation structures will produce better performance for future executions of the application, which will not incur the translation cost because they are able to use the cached translation structures immediately upon startup. One optimization of the aggressive optimization strategy is that future translator instances of the same subject program which encounter untranslated subject code may choose not to apply aggressive optimization initially, in order to reduce the marginal translation cost (and therefore latency) when exploring new code paths.

Those skilled in the art will appreciate that various adaptations and modifications of the just-described embodiments can be configured without departing from the scope and spirit of the invention. Therefore, it is to be understood that, within the scope of the appended claims, the invention may be practiced other than as specifically described herein.

What is claimed:

1. A method of translating a subject code executable by a subject computing architecture into a target code executable by a second computing architecture, wherein the subject code includes at least a first program and a second program, comprising:

providing a first translator instance which translates the subject code of the first program into the target code including translating a first portion of the subject code into a portion of the target code;

caching said portion of the target code into a shared code cache facility;

providing a second translator instance which is different from the first translator instance and which translates the subject code of the second program into the target code, wherein the second translator instance operates simultaneously with the first translator instance;

retrieving the cached portion of the target code from the shared code cache facility upon a compatibility detection between said cached portion of the target code and a second portion of the subject code in the second program, including loading the portion of the target code in the shared code cache facility into a portion of memory which is shared amongst at least the first and second translator instances; and, copying at least one part of the shared code cache facility to a private portion of memory associated with the second translator instance upon modification of the at least one part of the shared code cache facility by the second translator instance.

2. The method of claim 1 wherein said compatibility detection is determined by a cache key comparison between a cache key associated with the first portion of the subject code and the second portion of the subject code.

3. The method of claim 2 wherein the cache key is a byte sequence that encodes a subject code instruction sequence of the respective first and second portions of subject code.

4. The method of claim 2 wherein the cache key is a hash of the corresponding a subject code instruction sequence of the respective first and second portions of subject code.

5. The method of claim 2 wherein the cache key comprises:
a filename of an executable file containing the subject code;
an offset and a length of the subject code instruction sequence of the respective first and second portions of the subject code;
a last modification time of the executable file;
a version number of the respective first and second translator instance; and
a subject memory address where of the subject code instruction sequence was loaded.

6. The method of claim 2 wherein the cache key comprises a plurality of metrics.

7. The method of claim 2 wherein the compatibility detection is determined by computing a cache key data structure corresponding to the subject code to be translated to a plurality of second data structures, each second data structure corresponding to a different set of cached target code instructions.

8. The method of claim 1 further including executing the target code.

9. The method of claim 1 wherein translations of self-modifying code are not cached.

10. The method of claim 1 wherein the portion of target code cached comprises a translation structure including a basic block.

11. The method of claim 1 wherein the portion of target code cached comprises one or more block translations and their respective successor lists.

12. The method of claim 1 wherein the portion of target code is converted into a single cache unit comprising a subject program and all its associated libraries.

13. The method of claim 1 wherein the portion of target code cached consists of a single instruction.

14. The method of claim 1 wherein the portion of target code cached comprises all code blocks corresponding to the same starting subject address.

15. The method of claim 1 wherein the portion of target code cached comprises a cache unit representing a discrete range of subject addresses.

16. The method of claim 1 wherein the portion of target code cached as a unit comprises a subject library.

17. The method or claim 1, wherein said target code is cached at the end of translation of said first program.

18. The method of claim 1, wherein the first translator instance translates the first subject program including the first portion of the subject code into the portion of the target code, and the second translator instance translates the second subject program including reusing the portion of the target code created by the first translator instance.

19. The method of claim 1, further comprising:
copying the portion of target code from a private storage associated with the first translator instance to a shared code cache facility; retrieving the portion of target code from the shared code cache facility for reuse by the second translator instance.

20. The method of claim 19, further comprising:
selectively identifying one or more static target code portions amongst a plurality of portions of the target code produced by the first translator instance, wherein the static target code portions are derived from static subject code portions in the subject code; and
caching the identified static target code portions.

21. The method of claim 20, further comprising:
identifying one or more dynamic target code portions amongst a plurality of portions of the target code produced by the first translator instance, wherein the dynamic target code portions are derived from dynamically generated portions of the subject code; and
discarding the dynamic target code portions.

22. The method of claim 21, further comprising selectively identifying, caching, identifying and discarding upon completing execution of the first translator instance.

23. The method of claim 1, further comprising:
providing a shared code cache facility to cache the portion of the target code; and
selectively replacing the cached portion of target code in the shared code cache facility where the second translator instance provides an updated translation of the portion of target code.

24. The method of claim 23, further comprising:
publishing the portion of target code from the first translator instance to the shared code cache facility during execution of the first translator instance; and
retrieving the portion of the target code from the shared code cache facility for reuse by the second translator instance; wherein the first translator instance and the second translator instance execute concurrently.

25. The method of claim 24, wherein the publishing comprises publishing at cache synchronisation points having a predetermined trigger condition.

26. The method of claim 25, wherein the predetermined trigger condition is any one or more of:
idle periods when the first translator instance is inactive;
after a threshold number of translation structures have been generated; and
upon a request by the second translator instance.

27. The method of claim 1, further comprising:
providing a shared code cache facility to cache the portion of the target code; and selectively performing optimisations of the shared code cache facility.

28. The method of claim 27 wherein the optimisations comprise any one or more of:
restructuring a cache directory structure of the shared code cache facility to make searches for a particular portion of target code more efficient;
deleting translations that have been superseded by subsequent, more optimized translations of the same subject code;
rearranging the shared code cache facility to locate frequently requested portions of target code near each other;
performing offline optimizations of cached translations; and
performing offline predictive translation to translate subject code which has not yet been translated by a translator instance but which a translator instance is expected to encounter.

29. The method of claim 1, further comprising:
providing a shared code cache facility to cache the portion of target code; and
distributing the shared code cache facility amongst two or more caches.

30. The method of claim 29, wherein the distributing comprises providing scoped caches, ranged caches, or cache policies.

31. The method of claim 1, further comprising:
aggressively optimising the translation in the first translator instance to provide an optimized portion of target code; and
reusing the optimised portion of target code in the second translator instance.

32. The method of claim 31, further comprising:
performing a less aggressive optimised translation in the second translator instance when translating the second portion of subject code for which a portion of target code is not cached.

33. A computer system, comprising:
a target processor;
a shared code cache facility; and
translator code for translating a subject program code into target code executable on said target processor, said translator code comprising code executable by said target processor to:
provide a first translator instance which translates the subject code of a first program into the target code including translating a first portion of the subject code into a portion of the target code;
cache said portion of the target code in the shared code cache facility; and
provide a second translator instance which translates the subject code of a second program into the target code, wherein the second translator instance is different from the first translator instance and operates simultaneously with the first translator instance, and
wherein the second translator instance retrieves the cached portion of the target code from the shared code cache facility upon a compatibility detection between said cached portion of the target code and a second portion of the subject code in the second program, including loading the portion of the target code in the shared code cache facility into a portion of memory which is shared amongst at least the first and second translator instances; and, copying at least one part of the shared code cache facility to a private portion of memory associated with the second translator instance upon modification of the at least one part of the shared code cache facility by the second translator instance.

34. The computer system combination of claim 33 wherein said compatibility detection of cache translations and subject code to be translated is determined by a cache key comparison between a cache key associated with the first portion of the subject code and with the second portion of the subject code.

35. The computer system combination of claim 34 wherein the byte sequence that encodes the corresponding a subject code instruction sequence of the respective first and second portions of the subject code.

36. The computer system combination of claim 34 wherein the cache key is a hash of the corresponding a subject code instruction sequence of the respective first and second portions of the subject code.

37. The computer system combination of claim 34 wherein the cache key comprises:
a filename of an executable file containing the subject code;
an offset and a length of the subject code instruction sequence of the respective first and second portions of the subject code;
a last modification time of the executable file;
a version number of the respective first and second translator instance; and
a subject memory address where of the subject code instruction sequence was loaded.

38. The computer system combination of claim 34 wherein the cache key comprises a plurality of metrics.

39. The computer system combination of claim 34 wherein the compatibility detection is determined by comparing a cache key data structure corresponding to the subject code to be translated to a plurality of second data structures, each second data structure corresponding to a different set of cached target code instructions.

40. The computer system combination of claim 33 further including executing the target code.

41. The computer system combination of claim 33 wherein translations of self-modifying code are not cached.

42. The computer system combination of claim 33 wherein the portion of target code cached comprises a translation structure including a basic block.

43. The computer system combination of claim 33 wherein the portion of target code cached comprises one or more block translations and their respective successor lists.

44. The computer system combination of claim 33 wherein the portion of target code is converted into a single cache unit comprising a subject program and all its associated libraries.

45. The computer system combination of claim 33 wherein the portion of target code cached consists of a single instruction.

46. The computer system combination of claim 33 wherein the portion of target code cached comprises all code blocks corresponding to the same starting subject address.

47. The computer system combination of claim 33 wherein the portion of target code cached comprises a cache unit representing a discrete range of subject addresses.

48. The computer system combination of claim 33 wherein the portion of target code cached as a unit comprises a subject library.

49. A program storage medium storing translator code for translating subject code into target code, wherein the subject code includes at least a first program and a second program, said translator code, when executed by a computer, comprising:
providing a first translator instance executing on the computer which translates the subject code of the first program into the target code including translating a first portion of the subject code into a portion of the target code;

caching said portion of the target code into a shared code cache facility; and providing a second translator instance executing on the computer, wherein the second translator instance is different from the first translator instance and wherein the second translator instance translates the subject code of the second program into the target code, including retrieving the cached portion of the target code from the shared code cache facility upon a compatibility detection between said cached portion of the target code and a second portion of the subject code in the second program, including loading the portion of the target code in the shared code cache facility into a portion of memory which is shared amongst at least the first and second translator instances; and, copying at least one part of the shared code cache facility to a private portion of memory associated with the second translator instance upon modification of the at least one part of the shared code cache facility by the second translator instance.

50. The storage medium of claim 49 wherein said compatibility detection of cache translations and subject code to be translated is determined by a cache key comparison between a cache key associated with the first portion of the subject code and the second portion of the subject code.

51. The storage medium of claim 50 wherein the cache key is a the byte sequence that encodes the corresponding a subject code instruction sequence of the respective first and second portions of subject code.

52. The storage medium of claim 50 wherein the cache key is a hash of the corresponding a subject code instruction sequence of the respective first and second portions of subject code.

53. The storage medium of claim 50 wherein the cache key comprises:
a filename of an executable file containing the subject code;
an offset and a length of the subject code instruction sequence of the respective first and second portions of the subject code;
a last modification time of the executable file;
a version number of the respective first and second translator instance; and
a subject memory address where of the subject code instruction sequence was loaded.

54. The storage medium of claim 50 wherein the cache key comprises a plurality of metrics.

55. The storage medium of claim 50 wherein the compatibility detection is determined by computing a cache key data structure corresponding to the subject code to be translated to a plurality of second data structures, each second data structure corresponding to a different set of cached target code instructions.

56. The storage medium of claim 49 further including executing the target code.

57. The storage medium of claim 49 wherein translations of self-modifying code are not cached.

58. The storage medium of claim 49 wherein the portion of target code cached comprises a translation structure including a basic block.

59. The storage medium of claim 49 wherein the portion of target code cached comprises one or more block translations and their respective successor lists.

60. The storage medium of claim 49 wherein the portion of target code is converted into a single cache unit comprising a subject program and all its associated libraries.

61. The storage medium of claim 49 wherein the portion of target code cached consists of a single instruction.

62. The storage medium of claim 49 wherein the portion of target code cached comprises all code blocks corresponding to the same starting subject address.

63. The storage medium of claim 49 wherein the portion of target code cached comprises a cache unit representing a discrete range of subject addresses.

64. The storage medium of claim 49 wherein the portion of target code cached as a unit comprises a subject library.

65. A program storage medium storing translator code for translating subject code into target code when said translator code is executed by a computer, the translator code comprising:
program code providing a first translator instance for translating a first portion of subject
code in a first program into a portion of target code; and
program code for caching said portion of target code into a shared code cache facility and for providing a second translator instance for retrieving said target code from said shared code cache facility upon detection of compatibility between a second portion of subject code in a second program and said portion of target code,
wherein said second translator instance operates simultaneously with the first translator instance, and program code for loading the portion of the target code in the shared code cache facility into a portion of memory which is shared amongst at least the first and second translator instances; and, copying at least one part of the shared code cache facility to a private portion of memory associated with the second translator instance upon modification of the at least one part of the shared code cache facility by the second translator instance.

66. A method of translating a subject code executable by a subject computing architecture into a target code executable by a second computing architecture, wherein the subject code includes at least a first program and a second program, comprising:
providing a first translator instance which translates the subject code of the first program into the target code including translating a first portion of the subject code into a first portion of the target code;
caching said first portion of the target code into a shared code cache facility;
providing a second translator instance which is different from the first translator instance and which translates the subject code of the second program into the target code, including translating a second portion of the subject code of the second program into a second portion of the target code; and
retrieving the cached first portion of the target code from the shared code cache facility upon a compatibility detection between said first cached portion of the target code and a second portion of the subject code in the second program and a determination that the first cached portion is better than the second portion of the target code, including loading the first portion of the target code in the shared code cache facility into a portion of memory which is shared amongst at least the first and second translator instances.

* * * * *